United States Patent
Liao et al.

(10) Patent No.: US 8,204,542 B2
(45) Date of Patent: *Jun. 19, 2012

(54) METHODS FOR PROCESSING APPARATUS ORIGINATED COMMUNICATION REQUEST AND COMMUNICATION APPARATUSES UTILIZING THE SAME

(75) Inventors: Ying-Chieh Liao, Taipei (TW); Chen-Hsuan Lee, Taipei (TW); Shih-Wen Fu, Taipei (TW)

(73) Assignee: Mediatek Inc., Hsin-Chu (TW)

(*) Notice: Subject to any disclaimer, the term of this patent is extended or adjusted under 35 U.S.C. 154(b) by 556 days.

This patent is subject to a terminal disclaimer.

(21) Appl. No.: 12/343,701

(22) Filed: Dec. 24, 2008

(65) Prior Publication Data

US 2009/0239576 A1    Sep. 24, 2009

Related U.S. Application Data

(63) Continuation-in-part of application No. 12/234,025, filed on Sep. 19, 2008.

(60) Provisional application No. 61/038,426, filed on Mar. 21, 2008, provisional application No. 61/047,143, filed on Apr. 23, 2008.

(51) Int. Cl.
*H04Q 1/00* (2006.01)

(52) U.S. Cl. .......................... 455/558; 455/405; 455/406

(58) Field of Classification Search .................. 455/405, 455/406, 414.1, 414.2, 556.1, 557, 558, 435.2, 455/218, 419, 420; 379/201.1, 114.01, 114.02, 379/144; 235/380, 382, 474, 492

See application file for complete search history.

(56) References Cited

U.S. PATENT DOCUMENTS

| | | | |
|---|---|---|---|
| 5,987,325 A * | 11/1999 | Tayloe | ........................ 455/435.2 |
| 6,185,436 B1 | 2/2001 | Vu | |
| 6,516,190 B1 | 2/2003 | Linkola | |
| 6,543,686 B1 * | 4/2003 | Ritter | ............................ 235/380 |
| 6,889,059 B1 * | 5/2005 | Fragola | .......................... 455/558 |

(Continued)

FOREIGN PATENT DOCUMENTS

CN    1383340    12/2002

(Continued)

OTHER PUBLICATIONS

English language translation of abstract of CN 1777306 (published May 24, 2006).

(Continued)

*Primary Examiner* — Jean Gelin
(74) *Attorney, Agent, or Firm* — Thomas|Kayden

(57) ABSTRACT

A communication apparatus is provided. A first subscriber identity card camps on a first cell belonging to a first wireless network via at least one radio transceiver module. A second subscriber identity card camps on a second cell belonging to a second wireless network via the radio transceiver module. A memory device stores information indicating at least one discount period of the first wireless network and at least one discount period of the second wireless network. A processor receives an apparatus originated communication request with a destination address, determines whether a current time falls within the discount period of the first wireless network or the discount period of the second wireless network, and establishes a wireless communication with a peer device of the received destination address through one of the first cell or the second cell in response to the fallen discount period.

29 Claims, 17 Drawing Sheets

U.S. PATENT DOCUMENTS

| | | | |
|---|---|---|---|
| 7,171,226 B2 | 1/2007 | Crocker et al. | |
| 7,174,174 B2 * | 2/2007 | Boris et al. | 455/461 |
| 7,489,947 B2 * | 2/2009 | Castrogiovanni et al. | 455/558 |
| 2002/0099846 A1 | 7/2002 | Hicks | |
| 2003/0125073 A1 | 7/2003 | Tsai et al. | |
| 2004/0006512 A1 * | 1/2004 | Rebsamen | 705/16 |
| 2004/0023687 A1 * | 2/2004 | Diomelli | 455/555 |
| 2005/0170854 A1 | 8/2005 | Benco et al. | |
| 2006/0258353 A1 | 11/2006 | Makela et al. | |
| 2007/0021149 A1 * | 1/2007 | Abbassikhah | 455/558 |
| 2007/0131780 A1 | 6/2007 | Ho | |
| 2007/0184858 A1 | 8/2007 | Landschaft et al. | |
| 2008/0020773 A1 | 1/2008 | Black et al. | |
| 2008/0070631 A1 | 3/2008 | Kumar | |
| 2009/0005085 A1 | 1/2009 | Das | |

FOREIGN PATENT DOCUMENTS

| | | |
|---|---|---|
| CN | 1777306 | 5/2006 |
| CN | 1812610 | 8/2006 |
| CN | 101056434 | 10/2007 |
| CN | 101094476 | 12/2007 |
| CN | 101094500 | 12/2007 |
| CN | 101098547 | 1/2008 |
| EP | 1718087 | 11/2006 |

OTHER PUBLICATIONS

English language translation of abstract of CN 1383340 (published Dec. 4, 2002).

English language translation of abstract of CN 101056434 (published Oct. 17, 2007).

English language translation of abstract of CN 101094476 (published Dec. 26, 2007).

English language translation of abstract of CN 1812610 (published Aug. 2, 2006).

English language translation of abstract of CN 101094500 (published Dec. 26, 2007).

English language translation of abstract of CN 101098547 (published Jan. 2, 2008).

* cited by examiner

US 8,204,542 B2

METHODS FOR PROCESSING APPARATUS ORIGINATED COMMUNICATION REQUEST AND COMMUNICATION APPARATUSES UTILIZING THE SAME

CROSS REFERENCE TO RELATED APPLICATIONS

This application is a Continuation-In-Part of pending U.S. patent application Ser. No. 12/234,025, filed Sep. 19, 2008, entitled "Methods for processing apparatus originated communication request, handling equipment identity request and communication apparatuses utilizing the same", which claims the benefit of U.S. Provisional Application No. 61/038,426 filed Mar. 21, 2008 and entitled "Systems and methods for handling mobile originated (MO) and mobile terminated (MT) calls with dual (U)SIM cards", and U.S. Provisional Application No. 61/047,143 filed Apr. 23, 2008 and entitled "Systems and methods for handling operations related to two (U)SIM cards". The entire contents of which are hereby incorporated by reference.

BACKGROUND OF THE INVENTION

1. Field of the Invention

The invention relates to methods for processing an apparatus originated communication request in a communication apparatus, and more particularly to a method for processing an apparatus originated communication request in a communication apparatus equipped with more than one subscriber identity card.

2. Description of the Related Art

The term "wireless", normally refers to an electrical or electronic operation, which is accomplished without the use of a "hard wired" connection. "Wireless communication", is the transfer of information over a distance without the use of electrical conductors or wires. The distances involved may be short (a few meters for television remote controls) or very long (thousands or even millions of kilometers for radio communications). The best known example of wireless communication is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and -defined cellular communication technologies. For example, the Global System for Mobile communications (GSM) is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Wireless Fidelity (Wi-Fi) is a technology defined by the 802.11 engineering standard and can be used for home networks, mobile phones, video games, to provide a high-frequency wireless local area network.

With the advanced development of wireless communication technologies, it is now possible to provide multiple wireless communication services using different or the same communication technologies in one mobile station (MS). In order to provide an efficient interface and reliable services, methods for handling an apparatus originated communication request and equipment identity requests are provided.

BRIEF SUMMARY OF THE INVENTION

Communication apparatuses are provided. An embodiment of a communication apparatus comprises at least one radio transceiver module, a first subscriber identity card camping on a first cell belonging to a first wireless network via the radio transceiver module, a second subscriber identity card camping on a second cell belonging to a second wireless network via the radio transceiver module, a memory device and a processor. The memory device stores information indicating at least one discount period of the first wireless network and at least one discount period of the second wireless network. The processor, coupled to the first subscriber identity card, the second subscriber identity card, the memory device and the radio transceiver module, receives an apparatus originated communication request with a destination address, determines whether a current time falls within the discount period of the first wireless network or the discount period of the second wireless network, and establishes a wireless communication with a peer device of the received destination address through one of the first cell or the second cell in response to the fallen discount period.

Another embodiment of a communication apparatus comprises at least one radio transceiver module, a first subscriber identity card camping on a first cell belonging to a first wireless network via the radio transceiver module, a second subscriber identity card camping on a second cell belonging to a second wireless network via the radio transceiver module, a memory device and a processor. The memory device stores information indicating a credit amount for a deductible communication fee of the first subscriber identity card and a credit amount for a deductible communication fee of the second subscriber identity card. The processor, coupled to the first subscriber identity card, the second subscriber identity card, the memory device and the radio transceiver module, receives an apparatus originated communication request with a destination address, compares the credit amount of the first subscriber identity card and the credit amount of the second subscriber identity card to determine one subscriber identity card with the greatest credit amount, and establishes a wireless communication of a peer device with the received destination address through one of the first cell and the second cell in response to the determined subscriber identity card.

Another embodiment of a communication apparatus comprises at least one radio transceiver module, a first subscriber identity card camping on a first cell belonging to a first wireless network via the radio transceiver module, a second subscriber identity card camping on a second cell belonging to a second wireless network via the radio transceiver module, a memory device and a processor. The memory device stores a plurality of recent apparatus terminated communication request records for recording recently received apparatus terminated communication requests over a predetermined period, each record comprises an origination address of a peer device and information indicating either the first subscriber identity card or the second subscriber identity card that the peer device intended to communicate with for each apparatus terminated communication request. The processor, coupled to the first subscriber identity card, the second subscriber identity card, the memory device and the radio transceiver module, receives an apparatus originated communication request with a destination address, determines whether the destination address is stored in one of the recent apparatus terminated communication request records, and when the destination address is stored in one of the recent apparatus terminated communication request records, the processor determines whether the first subscriber identity card or the second subscriber identity card is the one that the destination address previously intended to communicate with and establishes a wireless communication with the destination address through one of the first cell and the second cell in response to the determined subscriber identity card.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

Table 1 shows exemplary discount period records; and

Table 2 shows an exemplary tariff table according to the embodiment of the information.

DETAILED DESCRIPTION OF THE INVENTION

The following description is of the best-contemplated mode of carrying out the invention. The description is made for the purpose of illustrating the general principles of the invention and should not be taken in a limiting sense. The scope of the invention is best determined by reference to the appended claims.

Figure 1:
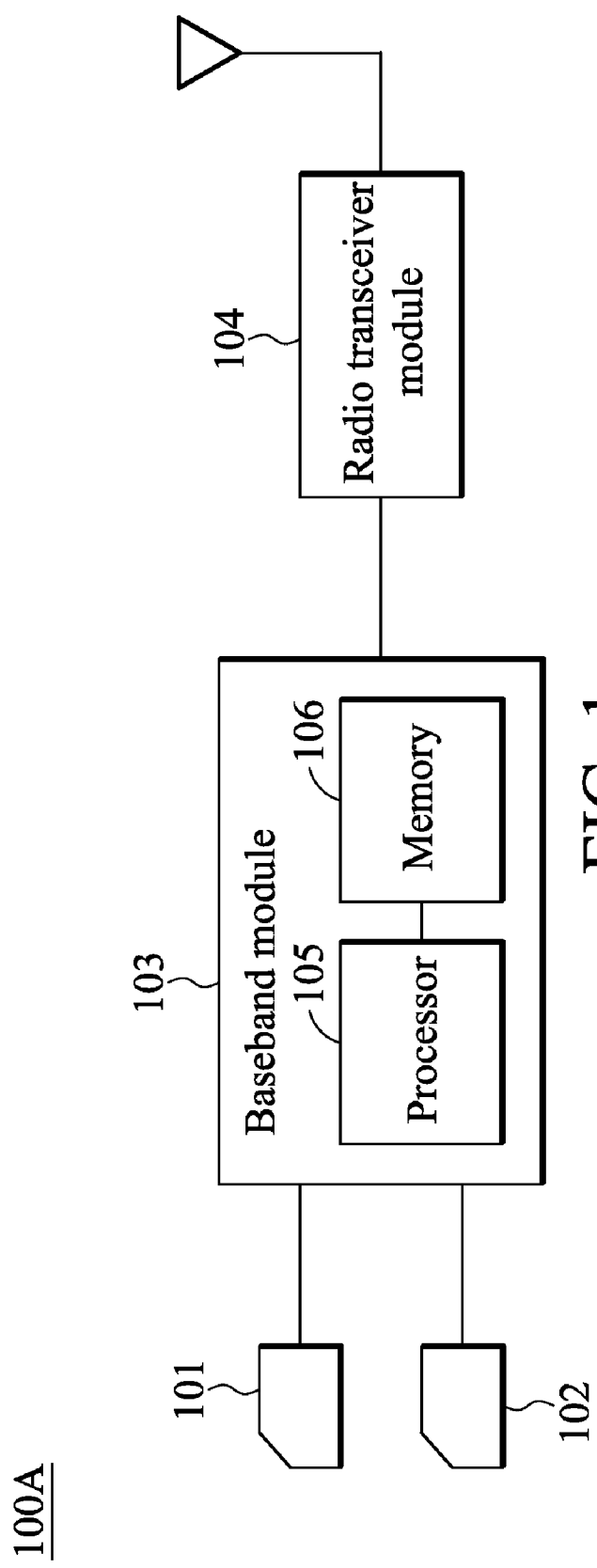
FIG. 1 shows a communication apparatus according to an embodiment of the invention.

FIG. 1 shows a communication apparatus capable of processing an apparatus originated communication request, also referred to as mobile originated (MO) call request, and handling the equipment identity requests according to an embodiment of the invention. As shown in FIG. 1, communication apparatus 100A comprises subscriber identity cards 101 and 102, a baseband module 103, and a radio transceiver module 104, wherein the baseband module 103 is coupled to the subscriber identity cards 101 and 102, and the radio transceiver module 104. The radio transceiver module 104 receives wireless radio frequency signals, converts the received signals to baseband signals to be processed by the baseband module 103, or receives baseband signals from the baseband module 103 and converts the received signals to wireless radio frequency signals to be transmitted to a peer device. The radio transceiver module 104 may comprise a plurality of hardware devices to perform radio frequency conversion. For example, the radio transceiver module 104 may comprise a mixer to multiply the baseband signals with a carrier oscillated in the radio frequency of the wireless communication system, wherein the radio frequency may be, for example, 900 MHz or 1800 MHz for a global system for mobile communication (GSM), or 1900 MHz for a Universal Mobile Telecommunications System (UMTS). The baseband module 103 further converts the baseband signals to a plurality of digital signals, and processes the digital signals, and vice versa. The baseband module 103 may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The baseband module 103 further comprises a memory device 106 and a processor 105 for controlling the operations of the baseband module 103, the radio transceiver module 104, and the subscriber identity cards 101 and 102 plugged into two sockets, respectively. The processor 105 reads data from the plugged subscriber identity cards 101 and 102 and writes data to the plugged subscriber identity cards 101 and 102. It is to be noted that the memory device 106 may also be configured outside of the baseband module 103 and the invention should not be limited thereto.

Figure 2:
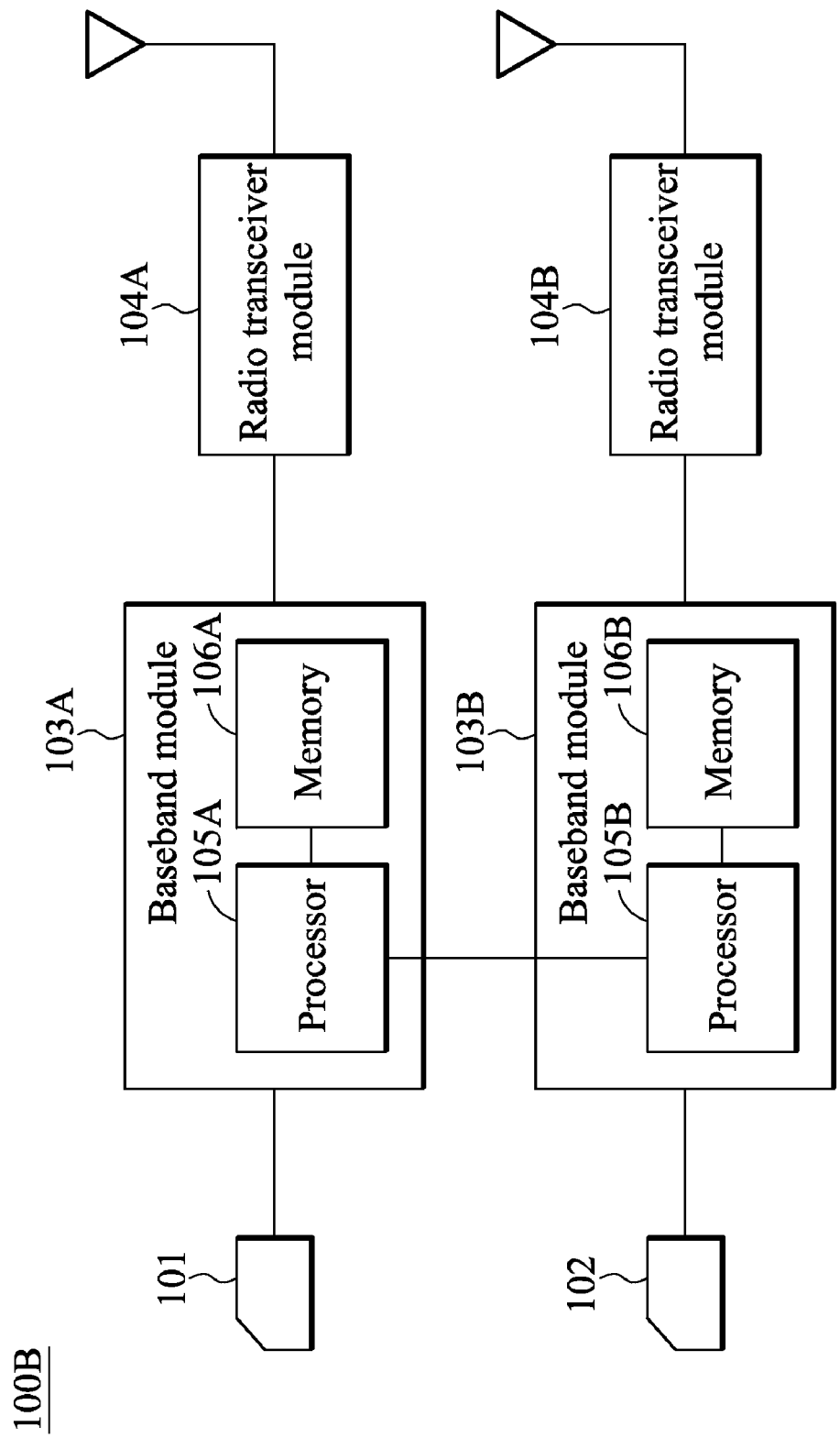
FIG. 2 shows a communication apparatus according to another embodiment of the invention.
Figure 3:
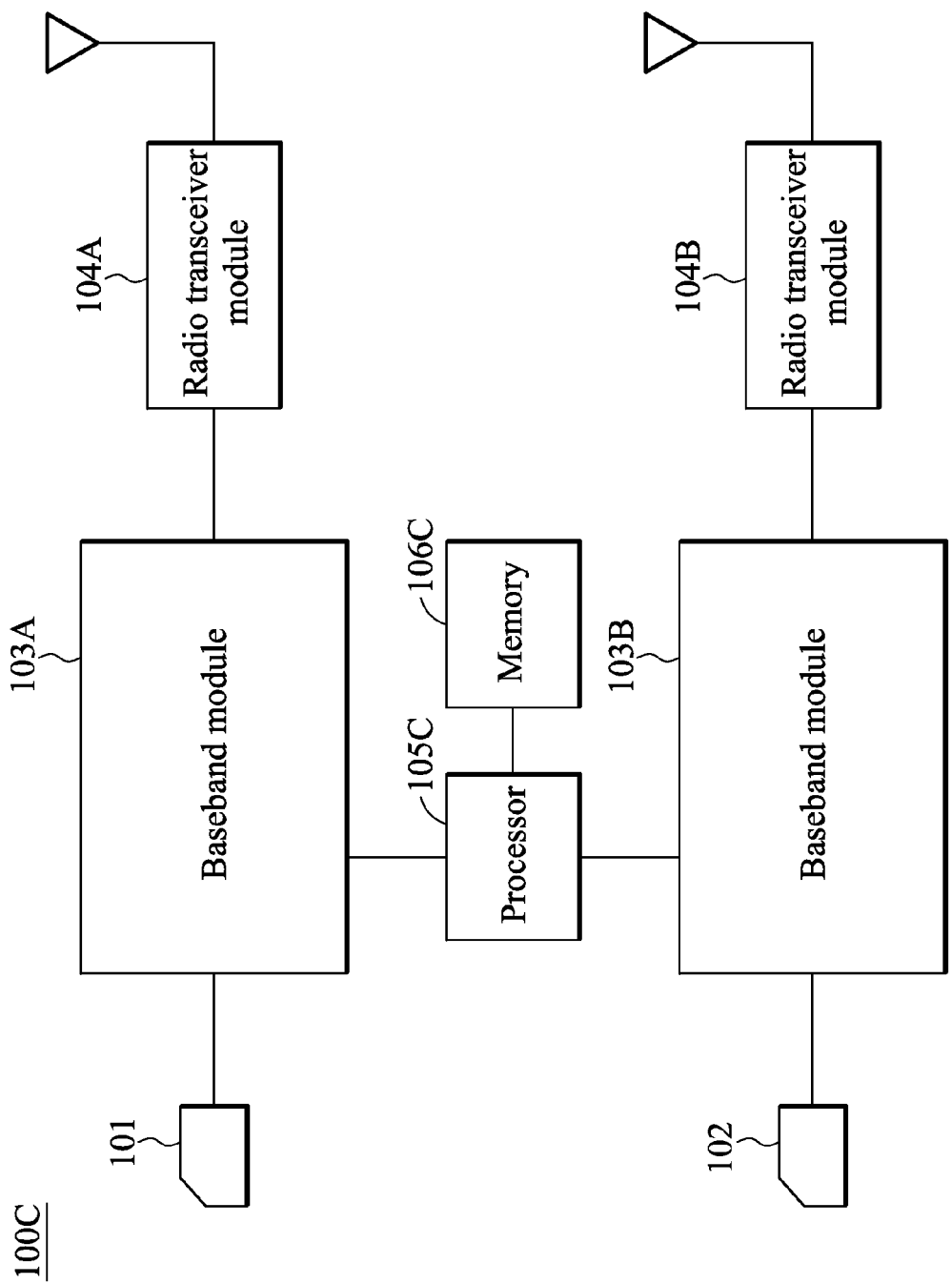
FIG. 3 shows a communication apparatus according to another embodiment of the invention.

According to another embodiment of the invention, the communication apparatus comprising more than one subscriber identity card, may also comprise more than one baseband module and radio transceiver module, respectively, for each subscriber identity card. FIG. 2 and FIG. 3 respectively show communication apparatuses according to other embodiments of the invention. As shown in FIG. 2 and FIG. 3, communication apparatus 100B comprises subscriber identity cards 101 and 102, baseband modules 103A and 103B, and radio transceiver modules 104A and 104B, wherein the baseband module 103A is coupled to the subscriber identity card 101 and the radio transceiver module 104A, and the baseband module 103B is coupled to the subscriber identity card 102 and the radio transceiver module 104B. The operations of the baseband modules 103A and 103B are similar with that of the baseband module 103 and are not illustrated here for brevity. Similarly, the operations of the radio transceiver module 104A and 104B are similar with that of the radio transceiver module 104 and are not illustrated here for brevity. It is noted that in FIG. 2, the baseband module 103A comprises a memory device 106A and a processor 105A for controlling the operations of the subscriber identity card 101, the baseband module 103A and the radio transceiver module 104A, and the baseband module 103B also comprises a memory device 106B and a processor 105B for controlling the operations of the subscriber identity card 102, the baseband module 103B and the radio transceiver module 104B. The processors 105A and 105B may be coupled and communicate with each other. The data stored in memory devices 106A and 106B may be shared and accessed by both of the processors 105A and 105B. For example, one of the processor may be a master processor and the other one may be a slave processor to cooperate with the master processor. As shown in FIG. 3, according to still another embodiment of the invention, the communication apparatus 100C may comprise one memory device 106C and one processor 105C for controlling the operations of the subscriber identity cards 101 and 102, the baseband modules 103A and 103B, and the radio transceiver modules 104A and 104B. The operations of the processor 105C are similar with that of the processor 105 and are not illustrated here for brevity. The described processors 105, 105A, 105B and 105C may be general-purposed processors and when executing program code perform the mentioned control operations. The described memory 106, 106A, 106B and 106C may comprise at least one of read only memory (ROM), random access memory (RAM), NOR flash and NAND flash for storing program code and data.

Figure 4:
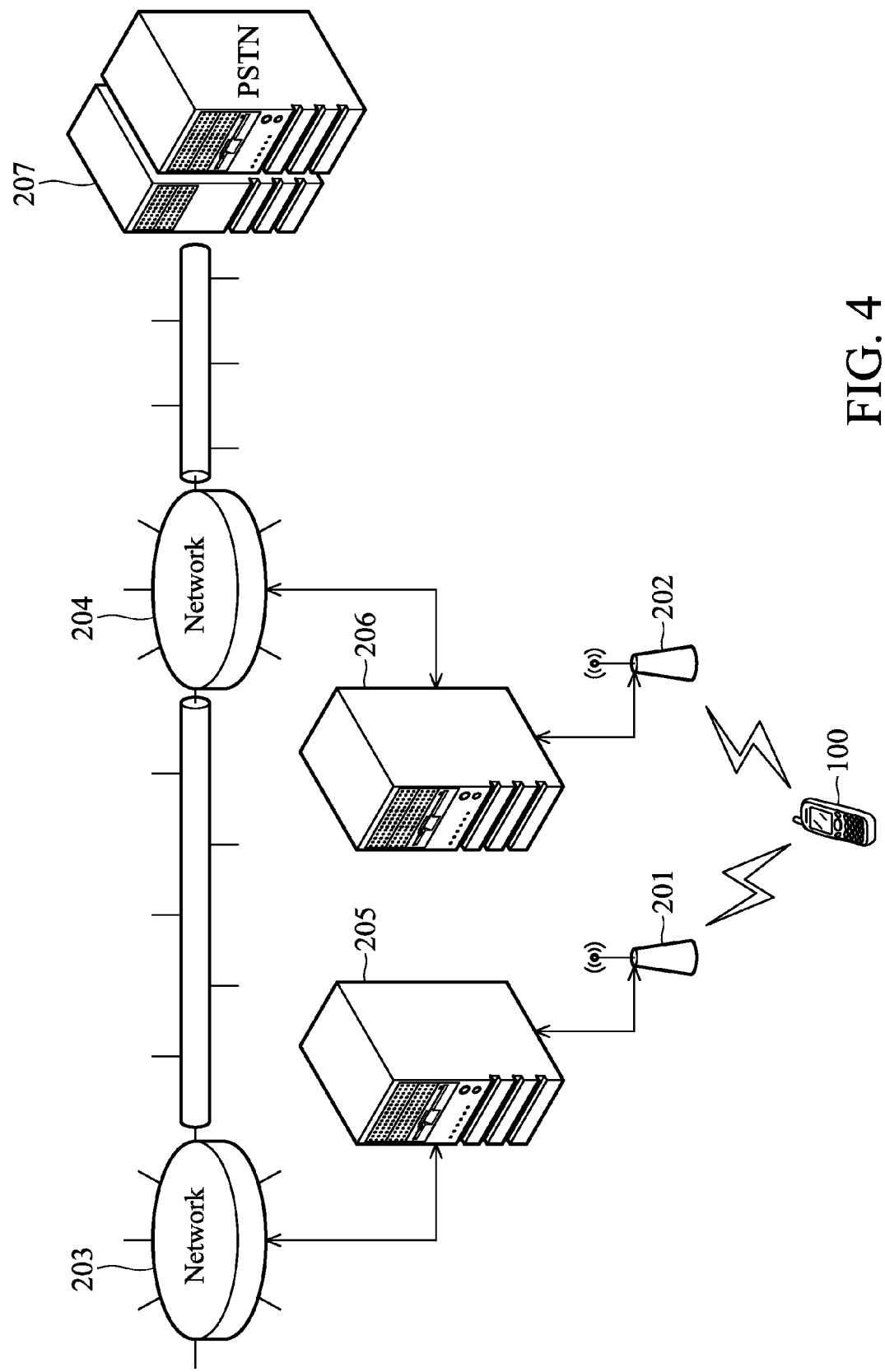
FIG. 4 shows an exemplary network topology according to an embodiment of the invention.

FIG. 4 shows an exemplary network topology according to an embodiment of the invention. The communication apparatus 100 shown in FIG. 4, may be the communication apparatuses 100A, 100B and 100C previously described in FIG. 1 to FIG. 3. Thus, from hereinafter, the communication apparatus 100 will be used to represent all like previously described apparatuses for brevity. The communication apparatus 100, equipped with more than one subscriber identity card, may simultaneously access more than one network 203 and 204 of the same or different communication technologies, where the network 203 or 204 may be the GSM, WCDMA, Wi-Fi, CDMA2000 or Time Division-Synchronous Code Division Multiple Access (TD-SCDMA) network, or Internet, or the like, after camping on or associating with the cells managed by access stations 201 and 202, where the access station 201 or 202 may be a base station, a node-B, an access point compatible with 802.1a, 802.1b or 802.1g. The communication apparatus 100 may issue an apparatus originated communication request, such as a voice call, a data call, a video call, or a voice over Internet Protocol (VOIP) call, to a called party (i.e. the corresponding peer of another wired or wireless communication apparatus) through at least one of the networks 203 and 204 with corresponding intermediary apparatuses 205 and 206 (for example, the GSM network with a Mobile Switching Center (MSC), the WCDMA/TD-SCDMA network with a Radio Network Controller (RNC), or the Internet with a Session Initiation Protocol (SIP) server), or through the Public Switched Telephone Network (PSTN) 207 or any combinations thereof, by using any of the equipped subscriber identity cards. Moreover, the communication apparatus 100 may receive an apparatus terminated communication request, also referred to as mobile terminated (MT) call request, such as an incoming phone call, with any of the subscriber identity cards from a calling party. It is to be understood that there may be one or more gateways positioned between heterogeneous types of networks.

According to an embodiment of the invention, the subscriber identity cards 101 and 102 may relate to one type of wireless communication system. For example, the subscriber identity card 101 or 102 may be the subscriber identity module (SIM) card corresponding to the GSM, or the universal subscriber identity module (USIM) card corresponding to the UMTS, or the removable user identity module (RUIM) card or the CDMA Subscriber Identity Module (CSIM) card corresponding to the CDMA2000 communication system, or others. An SIM card typically contains user account information, an international mobile subscriber identity (IMSI) and a set of SIM application toolkit (SAT) commands and provides storage space for phone book contacts. The processor, such as 105, 105A, 105B or 105C, of the baseband module, such as 103, 103A or 103B, may interact with a micro control unit (MCU) of the SIM card to fetch data or SAT commands from the plugged SIM card. The communication apparatus 100 is immediately programmed after being plugged into the SIM card. The SIM card may also be programmed to display custom menus for personalized services. The communication apparatus 100 may be plugged into an USIM card for UMTS (also called 3G) telephony communication. The USIM card stores user account information, IMSI, authentication information and a set of USIM Application Toolkit (USAT) commands and provides storage space for text messages and phone book contacts. The baseband processor 105, 105A, 105B or 105C may interact with an MCU of the USIM card to fetch data or SAT commands from the plugged USIM card. The phone book on the USIM card is more enhanced than that on the SIM card. For authentication purposes, the USIM card may store a long-term preshared secret key K, which is shared with the Authentication Center (AuC) in the network. The USIM MCU may verify a sequence number, that may be within a range, by using a window mechanism to avoid replay attacks, and generates the session keys CK and IK to be used in the confidentiality and integrity algorithms of the KASUMI (also termed A5/3) block cipher in the UMTS. The communication apparatus 100 is immediately programmed after being plugged into the USIM card. The IMSI is a unique number associated with a global system for mobile communication (GSM) or a universal mobile telecommunications system (UMTS) network user. The IMSI may be sent by the communication apparatus 100 to the GSM or UMTS network to acquire other details of the mobile user in the Home Location Register (HLR) or, as locally copied, in the Visitor Location Register (VLR). An IMSI is typically 15 digits long, but can be shorter. The first 3 digits are the Mobile Country Code (MCC), and the following digits, are the Mobile Network Code (MNC), which are either 2 digits (European standard) or 3 digits (North American standard). The remaining digits are the mobile subscriber identification number (MSIN) for the GSM or UMTS network user.

Figure 5:
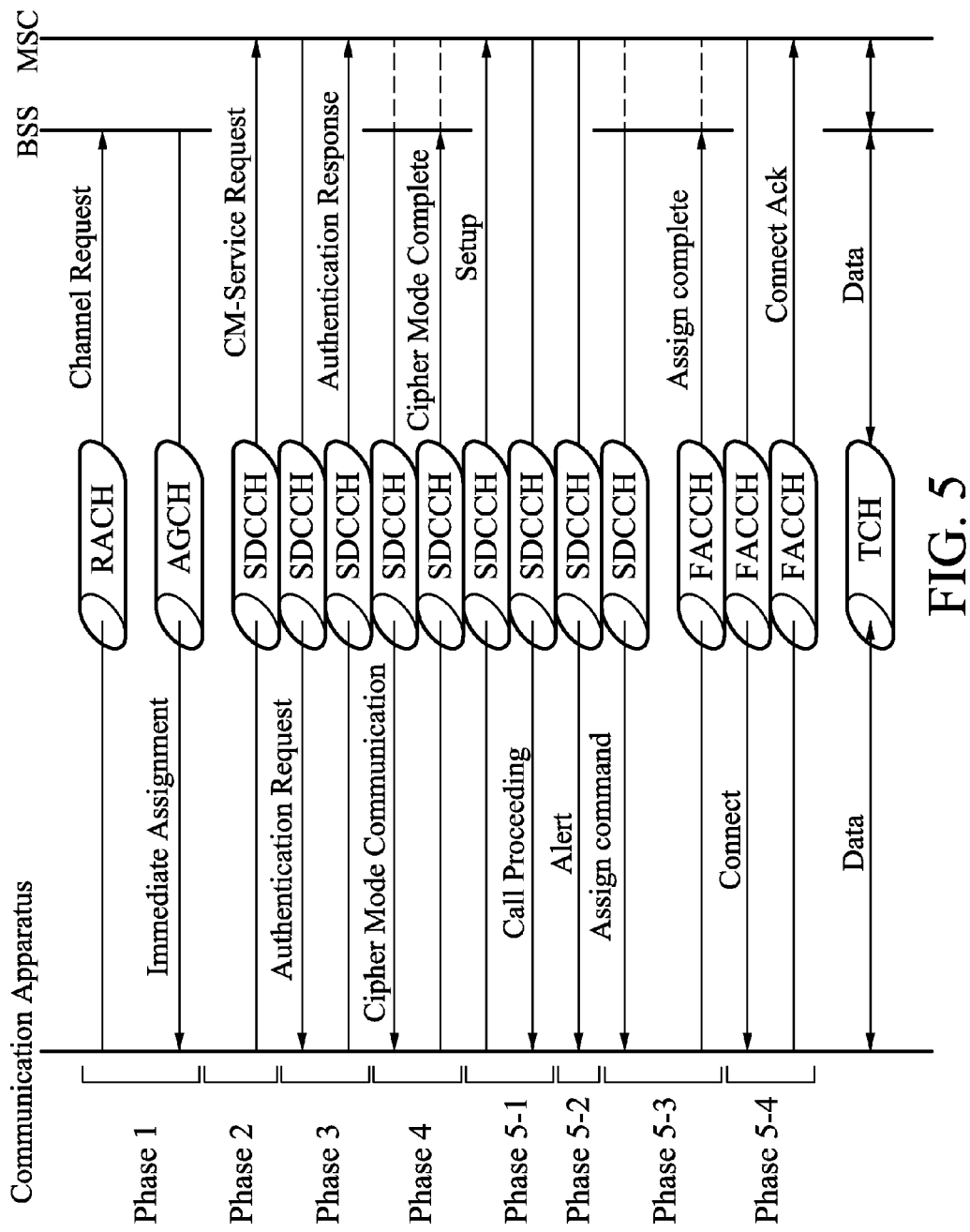
FIG. 5 shows logical channel assignments and signaling procedures of an apparatus originated request in the GSM.

FIG. 5 shows logical channel assignments and signaling procedures of an apparatus originated communication request in GSM. In the GSM, a Call Control (CC), comprises procedures to establish, control, and terminate a communication service, and is an element of Connection Management (CM). When the communication apparatus 100 plans to originate a communication service, such as a voice call service, the CC entity first requests a Mobility Management (MM) connection from the local MM entity (Phase 1) via a Random Access Channel (RACH). For a standard call, the communication apparatus 100 may need to register with the wireless network, whereas for an emergency call, registration is only optionally required. That is, an emergency call may be established on an unenciphered Radio Resource (RR) connection from a communication apparatus 100 that has not registered with the wireless network. The base station system (BSS) in the wireless network may assign a Stand-alone Dedicated Control Channel (SDCCH) or a Traffic Channel (TCH) via an Immediate Assignment carried in the Access Grant Channel (AGCH). After the process of sending out a CM-service request (Phase 2), authentication (Phase 3) and ciphering (Phase 4) with the MSC via the SDDCH is completed, an MM connection is established. After successful establishment of the MM connection and activation of the user data encryption, the service-requesting CC entity is informed. Thus, the signals on the connection desire to connect to the CC entity in the Mobile Switching Center MSC (SETUP). The MSC may respond to the connection request in several ways. The MSC may indicate with a message Call Proceeding (Phase 5-1) that the call request has been accepted and that all the necessary information for the setup of the call is available. Otherwise, the call request may be declined with a message Release Complete. Next, the communication apparatus 100 receives the Alert message (Phase 5-2) when the MSC is trying to connect to the called party. As soon as the called party receives the Alert message and accepts the call, the communication apparatus 100 receives an Assign Command and a dedicated channel will be assigned after the communication apparatus 100 responds to an Assignment Complete message via a Fast Associated Control Channel (FACCH) (Phase 5-3). The communication apparatus 100 next responds with a Connect Acknowledge message after receiving the Connect message from the MSC (Phase 5-4), and the traffic channel, successfully established on the TCH and the communication apparatus 100, may now begin to communicate with the called party. It is to be noted that the CC procedure of the WCDMA or TD-SCDMA system is similar to that of GSM system and is not further described for brevity.

Figure 6:
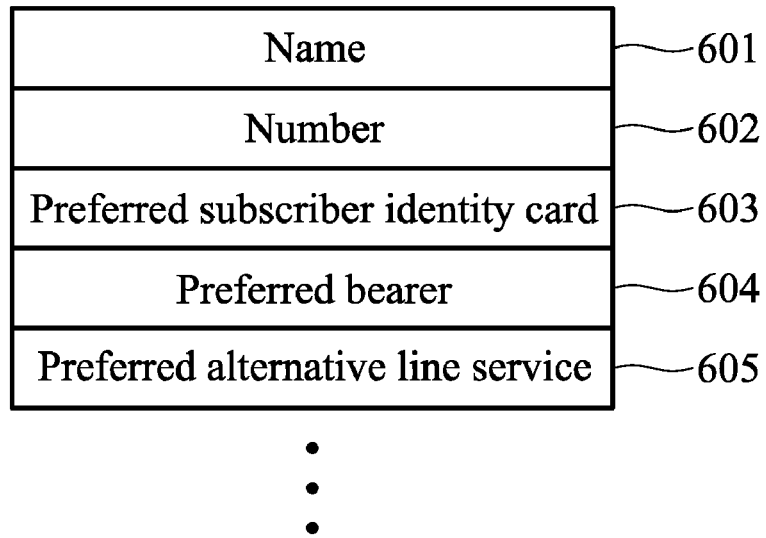
FIG. 6 shows a data structure for a phonebook entry according to an embodiment of the invention.

According to a first embodiment of the invention, the methods for processing an apparatus originated communication request in a communication apparatus, such as the communication apparatus 100A, 100B or 100C previously described and the communication apparatus 100, used hereinafter to represent all like previously described apparatuses for brevity, will be illustrated in the following. In the communication apparatus 100, a memory device such as the memory device 106, 106A, 106B or 106C previously described, may store a plurality of phonebook entries. Each phonebook entry may comprises a contact name, a destination address, identities for a preferred subscriber identity card, a preferred bearer and a preferred alternative line service, and the similar. The memory device 106, 106A, 106B or 106C in the communication apparatus 100 may be a non-volatile memory device that will store data even when the communication apparatus 100 is powered off. FIG. 6 shows a data structure for a phonebook entry 600 according to the first embodiment of the invention, where the phonebook entry 600 may be stored in the memory device such as the 106, 106A, 106B or 106C previously described. The Name field 601 may be used to store a contact name for another peer user. The Number field 602 may be used to store the destination address of the peer user. The destination address may be a series of predetermined numbers directed to the peer user, such as an IP address for a VOIP call or a phone number of another wired or wireless communication apparatus for a circuit switch call, or others. The preferred subscriber identity card field 603 may be used to store an identity regarding a preferred subscriber identity card that the user prefers to use when originating a connection with the peer user. Since as shown in FIG. 1 to FIG. 3, with the communication apparatus 100A, 100B or 100C comprising more than one subscriber identity card, the communication apparatus user may select a preferred subscriber identity card for a peer user and store the selection in the preferred subscriber identity card field 603, so as to use the preferred subscriber identity card when the user plans to originate a connection with the peer user. According to the embodiment, since each subscriber identity card comprises a unique identity, such as the IMSI previously described, the preferred subscriber identity card field 603 may store the identity of the selected subscriber identity card to distinguish from the other subscriber identity cards.

Figure 8:
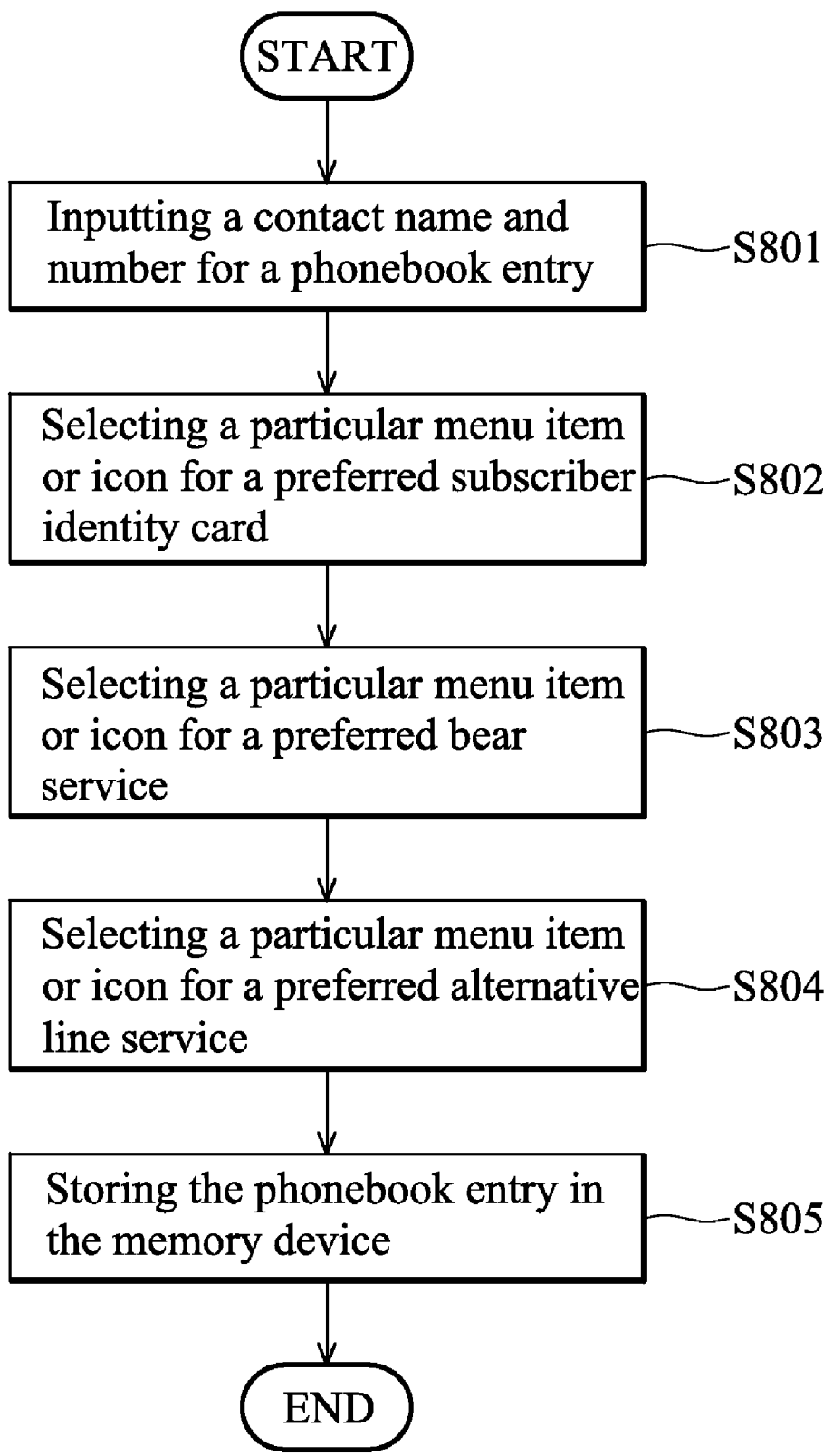
FIG. 8 shows a flow chart, facilitated by the MMI, for inputting the corresponding fields of a phonebook entry according to an embodiment of the invention.

The preferred bearer field 604 may be used to store a preferred bearer service that the user prefers to use when originating a connection with the peer user. The bearer represents an information transmission path, such as a voice call, a data call, a VOIP call, a video call, or others. The user may select an identity regarding a preferred bearer service and store the selection in the preferred bearer field 604 so as to use the preferred bearer when the user plans to originate a connection with the peer user. The preferred alternative line service field 605 may be used to store an identity regarding a preferred Alternate Line Service (ALS) that the user prefers to use when originating a connection with the peer user. It is to be understood that ALS provides the communication apparatus 100 with the capability of associating two alternate lines with one IMSI. A user will be able to make and receive calls on either line as desired and will be billed separately for calls on each line. Each line will be associated with a separate directory number (MSISDN) and separate subscription profile. The information stored in the phonebook entries may be input by a user via a man-machine interface (MMI). FIG. 8 shows a flow chart, facilitated by the MMI, for inputting the fields of a phonebook entry according to the first embodiment of the invention. The MMI may comprise screen menus and icons, command language and online help displayed on a display of the communication apparatus 100, with well as at least one input device of a touch panel, physical keys on a key pad, buttons, dragging jogs and the similar. By using input devices of the MMI, users may manually touch, press, click, rotate or move the input devices to operate the communication apparatus 100. Facilitated by the MMI, the user first inputs a contact name and a number for a phonebook entry (Step S801). Next, the user selects a particular menu item or icon representing a preferred subscriber identity card (Step S802), a relevant menu item or icon representing a preferred bear service (Step S803), and a specific menu item or icon representing a preferred alternative line service (Step S804) for the input contact name and number. Finally, the input data and selections are stored in relevant fields of a phonebook entry of the memory device (Step S805). It is to be understood that the user may not decide at least one for a preferred subscriber identity card, a preferred bear service and a preferred ALS, and null data or a particular code is stored in corresponding field of the entry.

Figure 7:
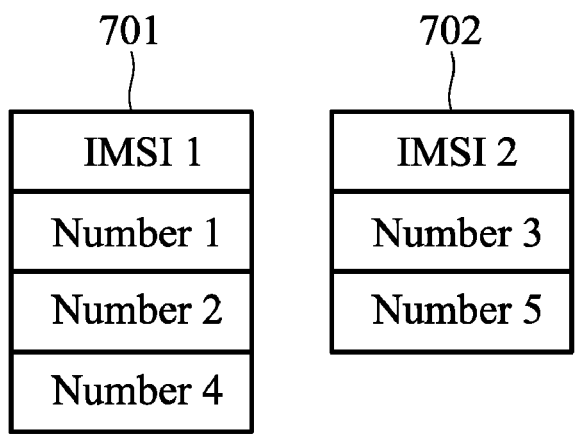
FIG. 7 shows a data structure of contact lists according to an embodiment of the invention.

Alternatively, when recording the identity of preferred subscriber identity card for each phonebook entry, the memory device of the communication apparatus 100, such as the 106, 106A, 106B or 106C previously described, or one of the subscriber identity cards 101 and 102 may store and maintain a contact list (or number list) for each subscriber identity card. FIG. 7 shows a data structure of the contact lists according to the first embodiment of the invention. The contact lists 701 and 702, respectively record the contact numbers 1, 2 and 4 for the subscriber identity card 101 and the contact numbers 3 and 5 for the subscriber identity card 102. As described above, the identities of the subscriber identity cards 101 and 102, such as the IMSI 1 and IMSI 2, may be used to distinguish one contact list from another. If a contact number is present in the list for the subscriber identity card 101, it means that user would more likely to connect to a peer user with the contact number via the subscriber identity card 101 instead of the subscriber identity card 102.

Figure 9:
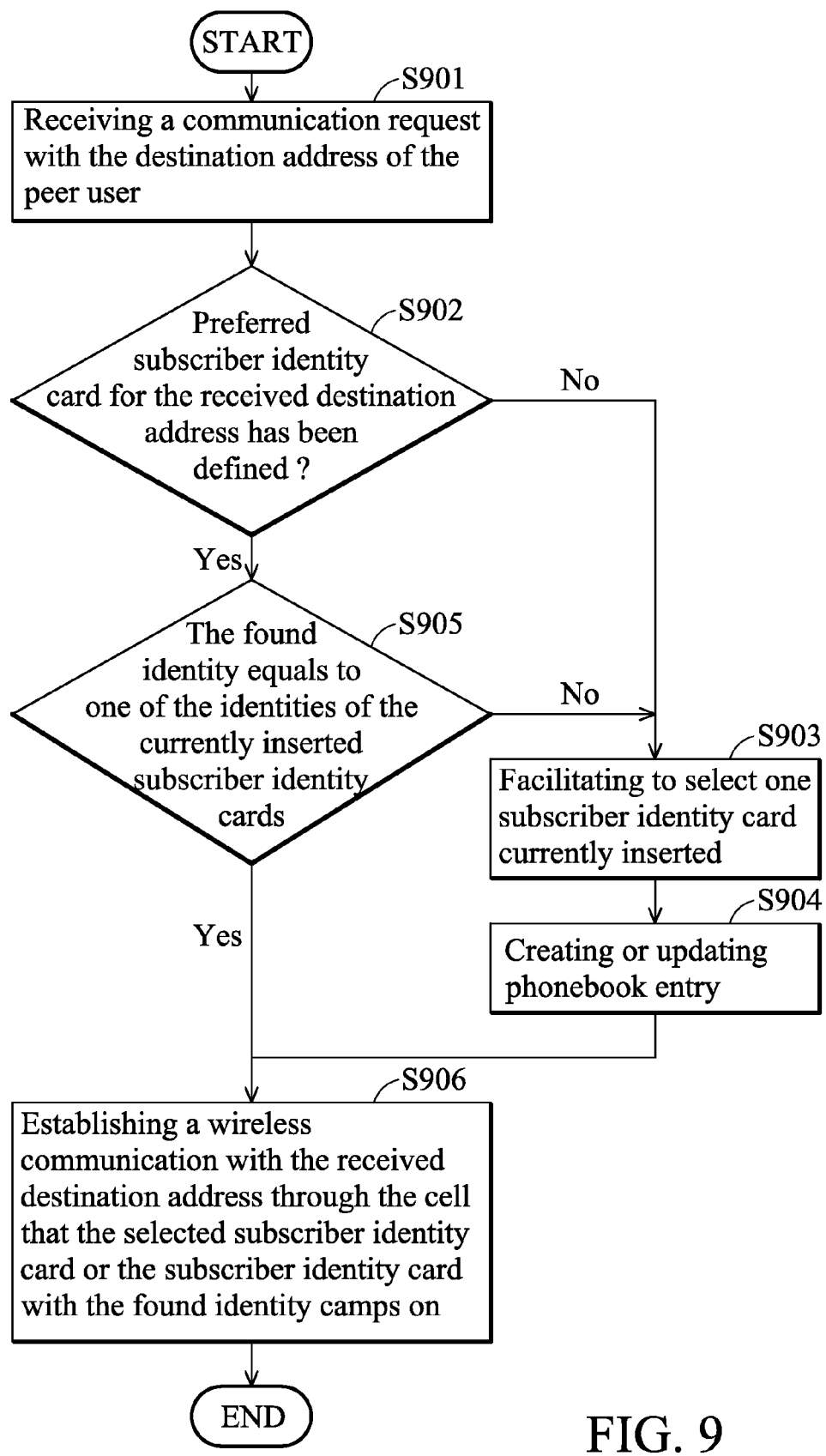
FIG. 9 shows a flow chart of a method for processing an apparatus originated communication request of a communication apparatus according to an embodiment of the invention.
Figure 11:
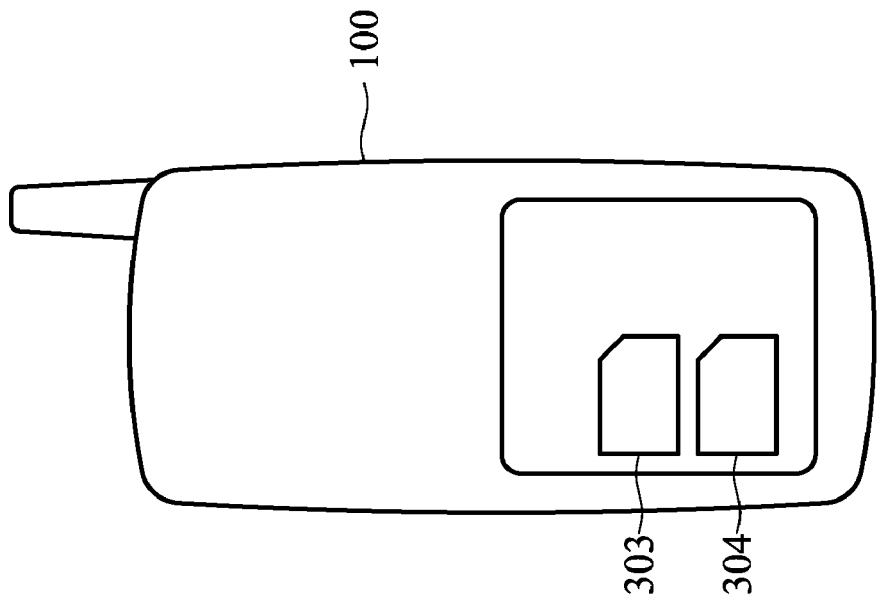
FIG. 11 shows a back side of the communication apparatus according to an embodiment of the invention.
Figure 10:
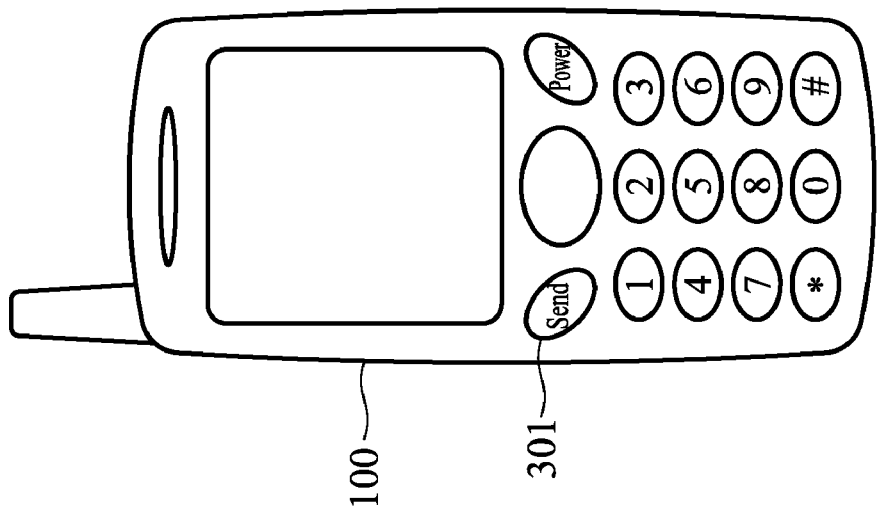
FIG. 10 shows a front side of the communication apparatus according to an embodiment of the invention.

FIG. 9 shows a flow chart of a method for processing an apparatus originated communication request of a communication apparatus, such as the communication apparatus 100, 100A, 100B, or 100C previously described, according to the first embodiment of the invention. When a user plans to originate a communication service with another peer user, a contact name of the peer user or a specific number of a telephone or a mobile station held by the peer user is selected from a contact menu by the user via an MMI, or a specific number of a telephone or a mobile station held by the peer user is input by the user via an MMI. After the user presses a SEND key 301 as shown in FIG. 10, the communication request may be originated by either the subscriber identity card 101 or 102 according to the preference setting of the corresponding phonebook entry as shown in FIG. 6 or the contact lists as shown in FIG. 7. As shown in FIG. 9, the processor (e.g. the processor 105, 105A, 105B or 105C) receives the communication request with the destination address of the peer user (Step S901). Next, the processor determines whether a preferred subscriber identity card for the received destination address has been defined, more specifically, determines whether an identity representing a preferred subscriber identity card has been stored in a preferred subscriber identity card field (e.g. 603) of a phonebook entry corresponding to the received destination address of the peer user by inspecting the stored phonebook entries (Step S902). When the preferred identity has not been found, an MMI is activated by the processor so that the user may select one subscriber identity card currently inserted, such as those inserted into the sockets 303 and 304 as shown in FIG. 11 (Step S903). Next, the processor may facilitate the user to decide whether to create a new phonebook entry or update the existing preferred subscriber identity card field related to the received destination address via the MMI (Step S904). It is to be noted that step S904 may be optional. When the preferred identity has been found, the processor further determines whether the found identity equals to one of the identities of the currently inserted subscriber identity cards (Step S905), such as the IMSI of the subscriber identity card 101 or 102. When the found identity equals to one of the identities of the currently inserted subscriber identity cards, the processor establishes a wireless communication with a peer device of the destination address through a cell that the subscriber identity card with the found identity or that the selected subscriber identity card camps on (Step S906). When the found identity does not equal to any of the identities of the currently inserted subscriber identity cards, the processor activates an MMI so that the user may select one currently inserted subscriber identity card to be used (Step S903), and facilitate the user to decide whether to create a new phonebook entry or update the existing phonebook entry related to the received destination address in response to the selected subscriber identity card (Step S904). After the processor obtains a signal indicating the selected subscriber identity card, the processor establishes a wireless communication with the destination address through the corresponding cell by using the selected subscriber identity card (Step S906).

Figure 12:
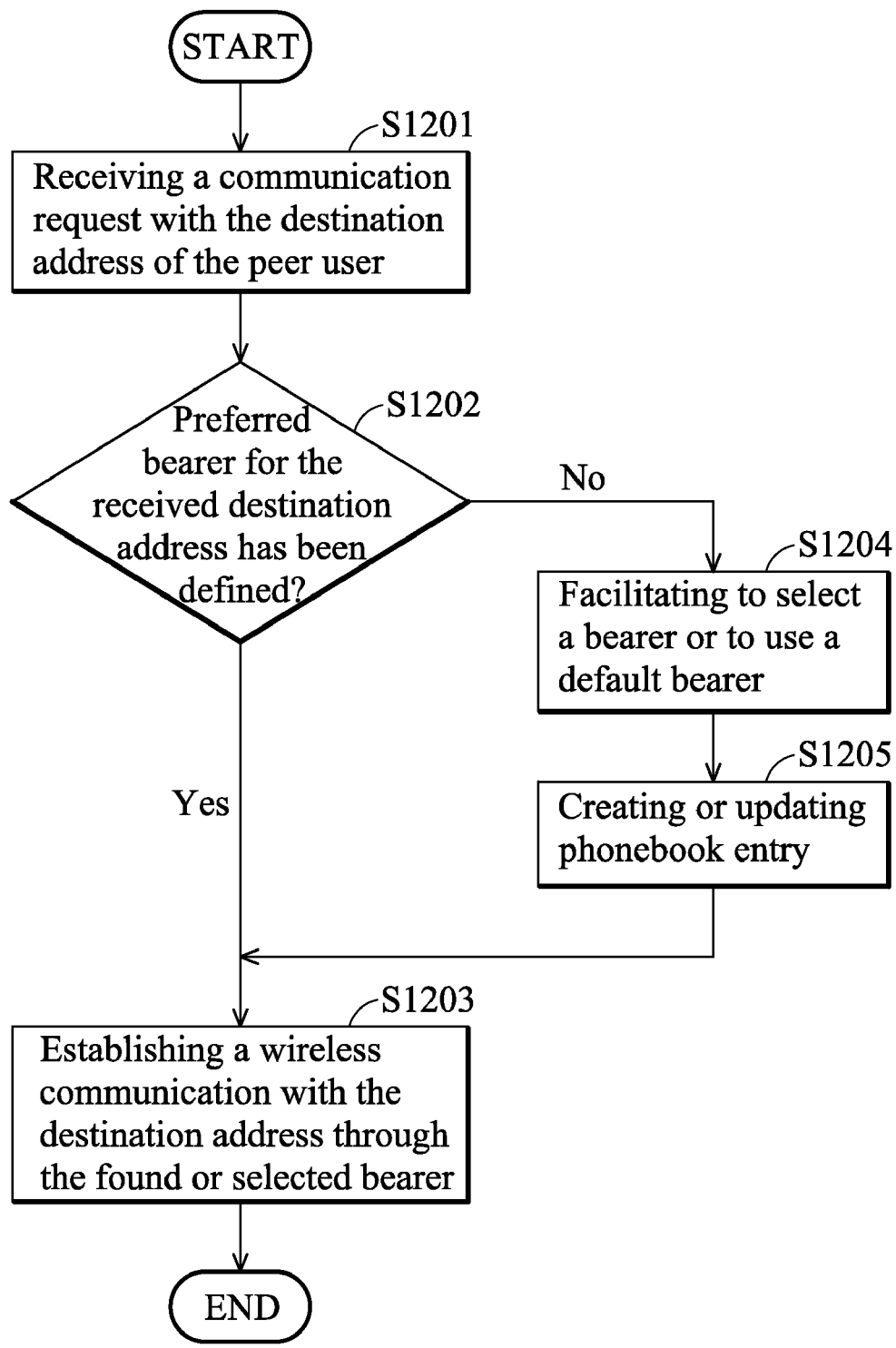
FIG. 12 shows a flow chart of a method for processing an apparatus originated communication request of a communication apparatus according to another embodiment of the invention.

According to another embodiment of the invention, the apparatus originated communication service may be established through the preferred bearer previously selected by the user by inspecting the preferred bearer field of the corresponding phonebook entry. FIG. 12 shows a flow chart of a method for processing an apparatus originated communication request of a communication apparatus, such as 100, 100A, 100B, or 100C previously described, according to the another embodiment of the invention. When a user plans to originate a communication service with another peer user, a contact name of the peer user or a specific number of a telephone or a mobile station held by the peer user is selected from a contact menu by the user via an MMI, or a specific number of a telephone or a mobile station held by the peer user is input by the user via an MMI. After the user presses a SEND key 301 as shown in FIG. 10, the communication request may be originated through the preferred bearer according to the preferred bearer setting of the corresponding phonebook entry. As shown in FIG. 12, the processor (e.g. 105, 105A, 105B or 105C) receives the communication request with the destination address of the peer user (Step S1201). Next, the processor determines whether a preferred bearer for the received destination address has been defined, more specifically, determines whether a preferred bearer has been stored in the preferred bearer field (e.g. 604) of the phonebook entry corresponding to the received destination address of the peer user by inspecting the stored phonebook entries (Step S1202). When the preferred bearer has been found, the processor establishes a wireless communication with a peer device with the destination address through the preferred bearer (Step S1203). When the preferred bearer has not been found, an MMI is activated by the processor to allow the user to select a bearer or to use a default bearer (Step S1204). Next, the processor may facilitate the user to decide whether to create a new phonebook entry or update the existing preferred bearer field related to the received destination address with the selected bearer via the MMI (Step S1205). It is to be noted that step S1205 may be optional. After the processor obtains a signal indicating the selected bearer, the processor establishes a wireless communication with the destination address through the selected bearer (Step S1203).

Figure 13:
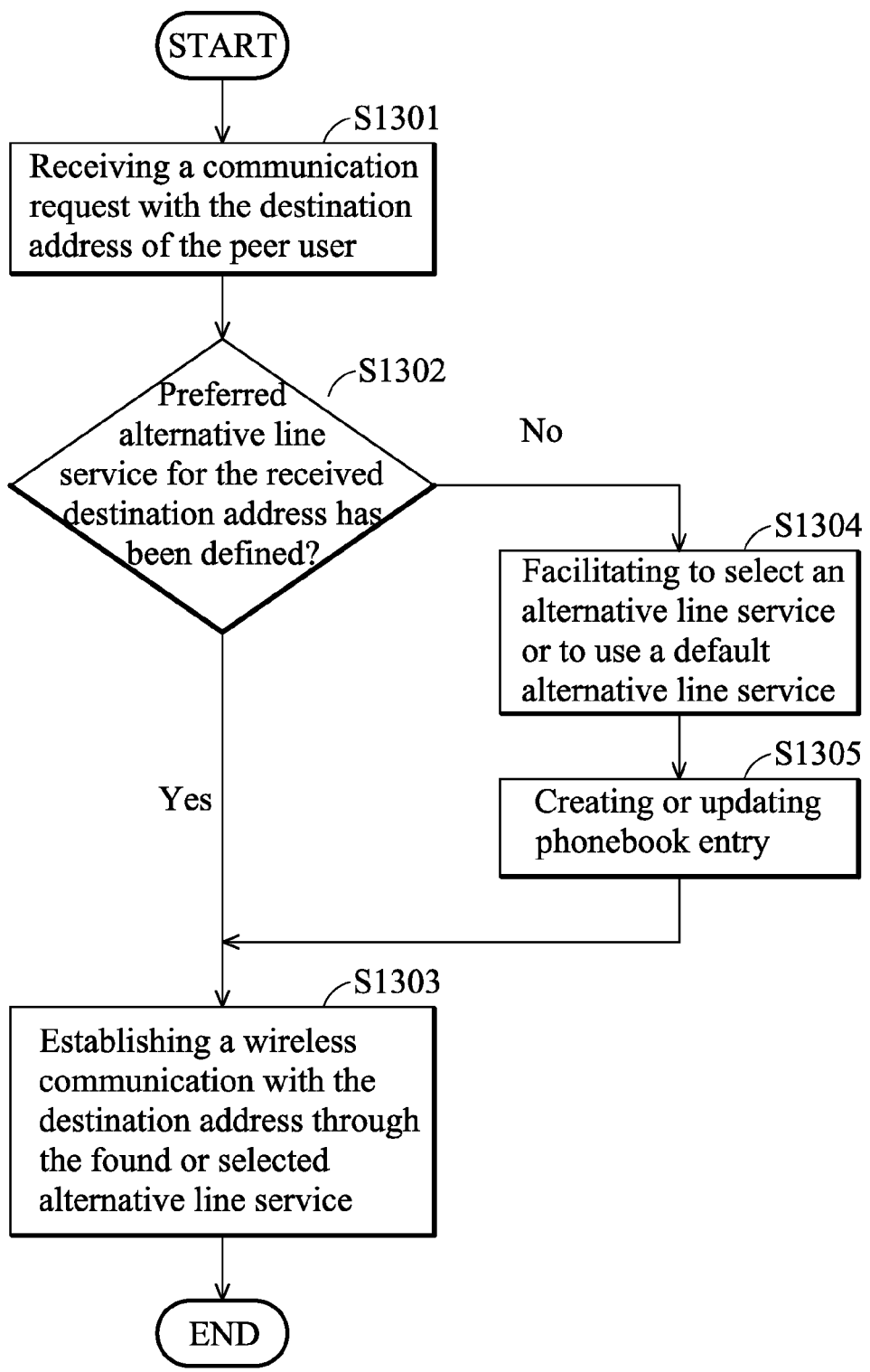
FIG. 13 shows a flow chart of a method for processing an apparatus originated communication request of a communication apparatus according to another embodiment of the invention.

According to yet another embodiment of the invention, the apparatus originated communication service may be established through the preferred alternative line service previously selected by the user by inspecting the preferred alternative line service field of the corresponding phonebook entry. FIG. 13 shows a flow chart of a method for processing an apparatus originated communication request of a communication apparatus, such as 100, 100A, 100B, or 100C previously described, according to yet another embodiment of the invention. When a user plans to originate a communication service with another peer user, a contact name of the peer user or a specific number of a telephone or a mobile station held by the peer user is selected from a contact menu by the user via an MMI, or a specific number of a telephone or a mobile station held by the peer user is input by the user via an MMI. After the user presses a SEND key 301 as shown in FIG. 10, the communication request may be originated through the preferred alternative line service according to the preferred alternative line service setting of the corresponding phonebook entry. As shown in FIG. 13, the processor (e.g. 105, 105A, 105B or 105C) receives the communication request with the destination address of the peer user (Step S1301). Next, the processor determines whether a preferred alternative line service has been defined, more specifically, determines whether a preferred alternative line service has been stored in the preferred alternative line service field (e.g. 605) of the phonebook entry corresponding to the received destination address of the peer user by inspecting the stored phonebook entries (Step S1302). When the preferred alternative line service has been found, the processor establishes a wireless communication with a peer device with the destination address through the preferred alternative line service (Step S1303). When the preferred alternative line service has not been found, an MMI is activated by the processor to allow the user to select an alternative line service or to use a default alternative line service (Step S1304). Next, the processor may facilitate the user to decide whether to create a new phonebook entry or update the existing preferred alternative line service field related to the received destination address with the selected alternative line service via the MMI (Step S1305). It is to be noted that step S1305 may be optional. After the processor obtains a signal indicating the selected alternative line service, the processor establishes a wireless communication with the destination address through the selected alternative line service (Step S1303).

Figure 14:
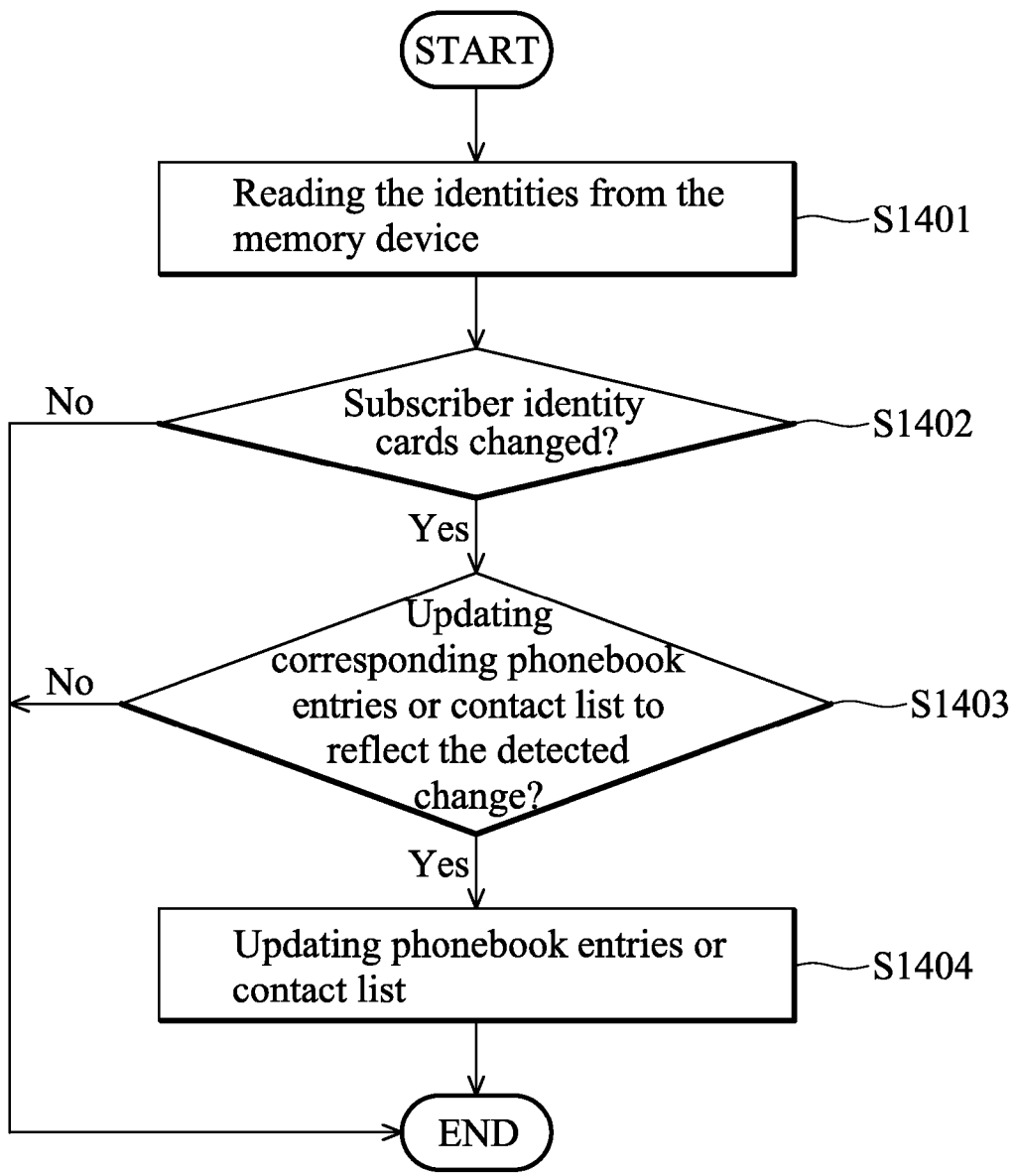
FIG. 14 shows a flow chart of the method for updating the corresponding field of phonebook entry according to an embodiment of the invention.

According to yet another embodiment of the invention, the memory device, such as the 106, 106A, 106B or 106C, may further store a plurality of identities of the previously inserted subscriber identity cards at a moment, for example, at a moment after a previous power-on, wherein the subscriber identity cards, such as 101 and 102, may be respectively inserted into the sockets 303 and 304 as shown in FIG. 11. It is to be understood that the identities of the previously inserted subscriber identity cards are stored in a non-volatile region of the memory device. Since any of the subscriber identity cards may be replaced by the user, the processor may further detect whether the subscriber identity cards have been changed, by comparing the identities stored in the memory device with the identities of the subscriber identity cards currently inserted into the sockets 303 and 304, and then correspondingly decide whether to update the content of the phonebook entries. According the embodiment of the invention, the detection may be implemented after the communication apparatus 100 is powered on and the recorded identities may be the IMSI or the Integrated Circuit Card Identity (ICCID) of the subscriber identity cards. FIG. 14 shows a flow chart of the method for updating the phonebook entries according to the embodiment of the invention. First, the processor (e.g. 105, 105A, 105B or 105C) reads the identities of the previously inserted subscriber identity cards from the memory device (Step S1401). Next, the processor determines whether at least one of the subscriber identity cards have been changed by comparing the read identities with the identities of the currently inserted subscriber identity cards (Step S1402). When the processor detects that any previous subscriber identity card is changed, or there is a subscriber identity card newly inserted, the processor further activates an MMI to allow the user to decide whether to update corresponding phonebook entries or contact list related to the subscriber identity card that are now removed to reflect the detected change (Step S1403). For example, the processor detects the change when the an IMSI of the memory device is found in one of the inserted subscriber identity card and another IMSI of the memory device is not found in all inserted subscriber identity cards, and determines that the a subscriber identity card containing the not found IMSI has been replaced with another subscriber identity card whose IMSI is not recorded in the memory device. When the user decides to update, the processor updates all preferred subscriber identity card fields (e.g. 603) recording an identity corresponding to the removed subscriber identity card to replace with another identity corresponding to the newly inserted subscriber identity card or updates a contact list (e.g. 701 or 702) containing an identity of the removed subscriber identity card to replace with another identity of newly inserted subscriber identity card (Step S1404). It is to be understood that after the detection shown in FIG. 14 the memory device is updated to store identities of currently inserted subscriber identity cards.

Figure 15:
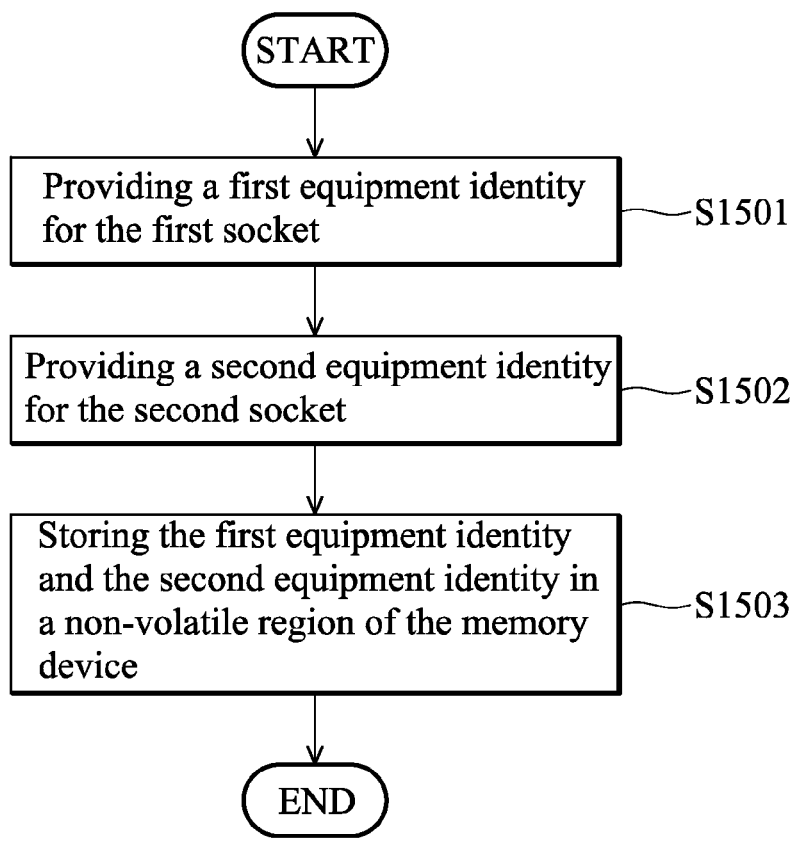
FIG. 15 shows a flow chart of providing the IMEIs for the communication apparatus according to an embodiment of the invention

According to a second embodiment of the invention, the communication apparatus 100A with more than one inserted subscriber identity card may handle multiple equipment identity requests from more than one camped on cell to provide a more reliable service. Typically, a communication apparatus is uniquely identified by an international mobile station equipment identity (IMEI). The IMEI may be composed of a Type Approval Code (TAC, 6 digits), a Final Assembly Code (FAC, 2 digits), a Serial Number (SNR, 6 digits) and a spare digit. The FAC identifies the manufacturing/final assembly location. The SNR uniquely identifies the communication apparatus 100A within each TAC and FAC. The spare digit may be zero, when transmitted by the communication apparatus 100A. Because the communication apparatus 100A is equipped with a single radio transceiver module 104 and baseband module 103 as shown in FIG. 1, the baseband module 103 may store two IMEIs in the memory device 106 for two subscriber identity cards respectively inserted into two sockets (e.g. sockets 303 and 304). Assuming that the subscriber identity cards are respectively inserted into sockets A and B (e.g. 303 and 304), then IMEI A and IMEI B corresponding to sockets A and B may be respectively provided when manufacturing the communication apparatus 100A and may be stored in a non-volatile region of the memory device. FIG. 15 shows a flow chart of providing the IMEIs when manufacturing the communication apparatus 100A according to an embodiment of the invention. First, a first equipment identity is provided for the first socket (Step S1501). Next, a second equipment identity is provided for the second socket (Step S1502). Finally, the first equipment identity and the second equipment identity are stored in a non-volatile region of the memory device (Step S1503).

There are various procedures to be used for mobility management for General Packet Radio Service (GPRS) services and for non-GPRS services at the radio interface. The main function of the Mobility Management (MM) sub-layer is to support the mobility of communication apparatus 100A, such as informing the wireless network of its present location and providing user identity confidentiality. The MM sub-layer further provides connection management services to the different entities of the upper Connection Management (CM) sub-layer. Two sets of procedures may be defined for MM procedure: MM procedures for non-GPRS services; and GMM procedures for GPRS services. Meanwhile, three types of MM procedures are provided: MM common procedures, MM specific procedures and MM connection management procedures, wherein initiation is dependent upon circumstances. An MM common procedure may be initiated whilst an RR connection exists. An MM specific procedure may be initiated if no other MM specific procedure is running or no MM connection exists. An MM connection management procedure is used to establish, maintain and release an MM connection between the communication apparatus and the wireless network. Meanwhile, an entity of the upper CM layer may exchange information with its peer. Two types of GMM procedures: GMM common procedures and GMM specific procedures are provided. A GMM common procedure can always be initiated whilst a packet switch signaling connection exists. A GMM specific procedure is initiated by the wireless network and used by the IMSI in the wireless network for GPRS services and/or non-GPRS services and to release a GMM context.

Figure 16:
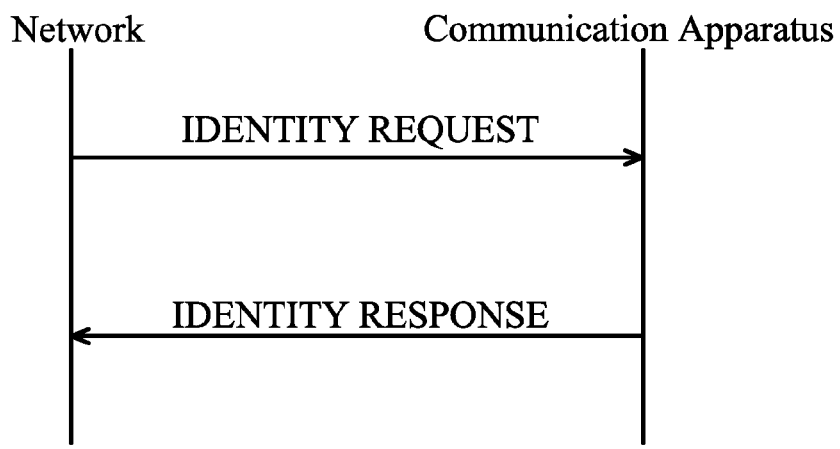
FIG. 16 shows a sequence diagram illustrating an identification procedure according to an embodiment of the invention.

Because the communication apparatus 100A is equipped with only one radio transceiver module 104 and baseband module 103 but carrying two subscriber identity cards as shown in FIG. 1, the communication apparatus 100A may camp on two cells with respectively two IMSI stored in the inserted subscriber identity cards 101 and 102. FIG. 16 shows a sequence diagram illustrating an identification procedure according to the embodiment of the invention. In the MM common procedures or MM specific procedures, the identification procedure as shown in FIG. 16 may be used by the wireless network to request a communication apparatus 100A to provide specific identification parameters to the wireless network, such as an IMSI or an IMEI. The identification procedure may be triggered during location update or other circumstances. The wireless network initiates the identification procedure by transferring an IDENTITY REQUEST message to the communication apparatus 100A. The IDENTITY REQUEST message specifies the requested identification parameters in the identity type information element, wherein the identity type may be an IMSI or IMEI. Upon the reception of the IDENTITY REQUEST message with the identity type set as an IMEI, the communication apparatus 100A sends back an IDENTITY RESPONSE with one IMEI. Sometimes, two subscriber identity cards (e.g. 101 and 102) may camp on different cells of the same network operator, and unexpected situations may occur when responding with the same IMEI to different cells. Specifically, the network operator may determine that the communication apparatus 100A is in an abnormal situation and block the communication with the communication apparatus 100A when discovering that more than two IMSI are associated with the same IMEI in a predetermined time interval via the mentioned identification procedure.

Figure 17:
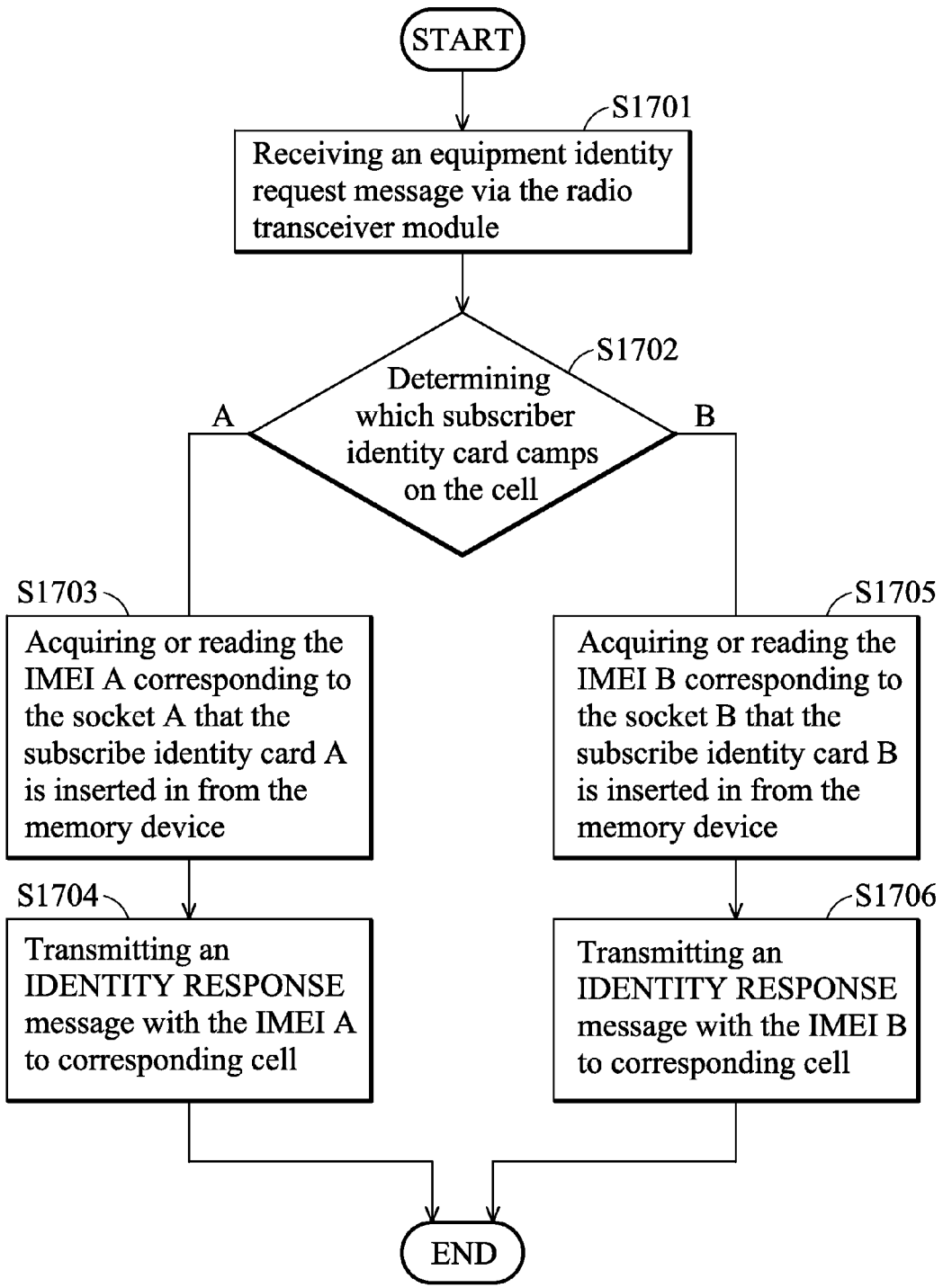
FIG. 17 shows a flow chart of the method for handling the equipment identity requests in the identification procedure according to an embodiment of the invention.

FIG. 17 shows a flow chart of the method for handling the equipment identity requests in the identification procedure according to an embodiment of the invention. First, the processor (e.g. 105) receives an equipment identity request message from a cell belonging to a wireless network via the radio transceiver module (Step 1701), wherein the equipment identity request message may be the IDENTITY REQUEST message with the identity type set as an IMEI as previously described. Next, the processor determines which cell has sent the equipment identity request message and which subscriber identity card camps on the cell (Step 1702). When the processor determines the subscribe identity card A (e.g. the subscribe identity card 101) camps on the cell sending out the IDENTITY REQUEST message, the processor acquires or reads out the IMEI A corresponding to the socket A that the subscribe identity card A is inserted into from the memory device (Step 1703) and transmits an IDENTITY RESPONSE message with the IMEI A to the corresponding cell of the wireless network via the radio transceiver module (Step 1704). When the processor determines the subscribe identity card B (e.g. the subscribe identity card 102) camps on the cell sending out the IDENTITY REQUEST message, the processor acquires or reads out the IMEI B corresponding to the socket B that the subscribe identity card B is inserted into from the memory device (Step 1705) and transmits an IDENTITY RESPONSE message with the IMEI B to the corresponding cell of the wireless network via the radio transceiver module (Step 1706).

Figure 18:
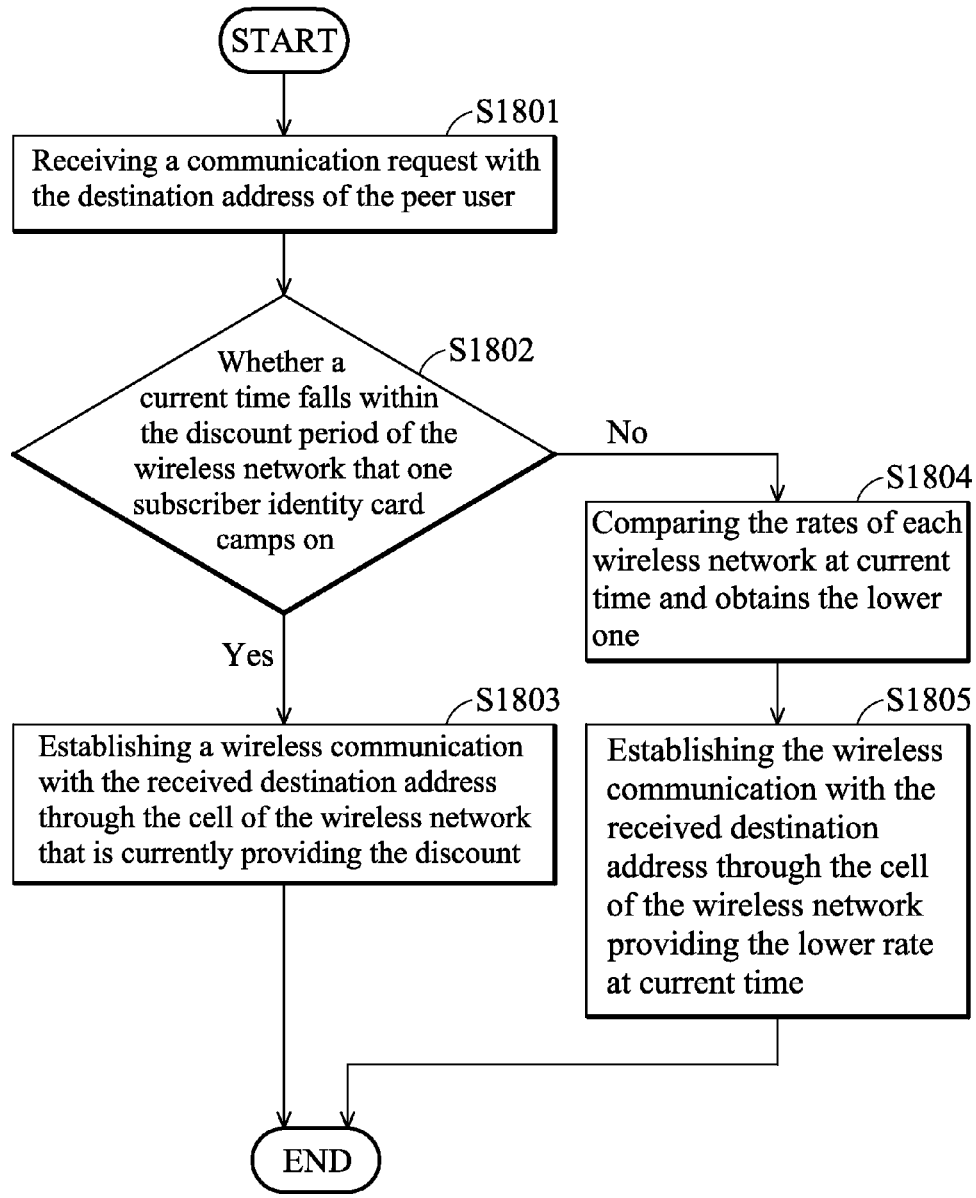
FIG. 18 shows a flow chart of a method for processing an apparatus originated communication request of a communication apparatus according to another embodiment of the invention.

FIG. 18 shows a flow chart of a method for processing an apparatus originated communication request of a communication apparatus, such as 100, 100A, 100B, or 100C previously described, according to another embodiment of the invention. According to an embodiment of the invention, the memory device, such as the 106, 106A, 106B or 106C, may store information indicating at least one discount period of the corresponding wireless network that each subscriber identity card, such as the 101 or 102, camps on. Since an operator of the wireless network may define different rates to be charged for providing wireless communication services during different time periods, or may define discount periods with a relatively lower rate, such as the time period beginning from midnight (e.g. 00:00:00) to the early hours in the morning (e.g. 05:59:59), in which few users are expected to use the wireless communication services, the communication apparatus 100, 100A, 100B, or 100C may store that information in the memory device so as to process the apparatus originated communication request with the consideration of the different communication costs. Table 1 shows exemplary discount period records according to the embodiment of the information.

TABLE 1 exemplary discount period records

| Subscriber identity card | Discount Period | Charge Per Sec |
|---|---|---|
| 101 | 23:00~01:59 | 0.0015 |
| 102 | 02:00~06:59 | 0.0013 |

As show in FIG. 18, the flow chart begins when the processor, such as 105, 105A, 105B or 105C, receives the communication request with a destination address of the peer user (Step S1801). Next, the processor determines whether a current time falls within the discount period of the wireless network that the subscriber identity card 101 camps on or the discount period of the wireless network that the subscriber identity card 102 camps on (Step S1802). According to an embodiment of the invention, the processor may check a real time clock (RTC) of the communication apparatus to obtain the current time information. When the current time falls within the discount period of the wireless network that one subscriber identity card camps on, the processor establishes a wireless communication with the received destination address through the cell of the wireless network that is currently providing the discount (Step S1803). Alternatively, when both of the wireless networks that the subscriber identity cards 101 and 102 camp on are currently providing the discount, or none of the wireless networks are currently providing the discount, the process further compares the rates of wireless network at current time and obtains the lower one (Step S1804).

According to the embodiment of the information, the memory device may further store a tariff table of each wireless network. The tariff table comprises information regarding rates charged by the corresponding wireless network for providing wireless communication services at different time periods. Table 2 shows an exemplary tariff table according to the embodiment of the information.

TABLE 2 exemplary tariff table

| Subscriber identity card | Time | Charge Per Sec |
|---|---|---|
| 101 | 09:00~12:00 | 0.002 |
| 101 | 23:00~01:00 | 0.0015 |
| 102 | 10:00~15:00 | 0.003 |

After obtaining the lower one, the processor establishes the wireless communication with the received destination address through the cell of the wireless network providing the lower rate at current time (Step S1805).

According to an embodiment of the invention, the discount period record of each wireless network as shown in Table 1 and the tariff table as shown in Table 2 may be input by the user via the MMI. The processor obtains the information from the MMI and stores it in the memory device. According to another embodiment of the invention, the processor may also obtain information regarding the rates of each wireless network according to an Advice of Charge (AoC) message received from the wireless network, and thereafter store that information in the memory device. As defined by the 3rd Generation Partnership Project (3GPP), an Advice of Charge message may be received at the beginning of each wireless communication (and as necessary during the wireless communication). The AoC message contains the elements which together define the rate at which the wireless communication is to be charged, time dependence, data dependence and for unit increments. Thus, the tariff table may be established according to the received AoC messages, so as to provide such rate information for later use.

According to yet another embodiment of the invention, the processor may also receive a service fee message indicating the total service fee for this wireless communication session from the wireless network after termination of the wireless communication. Allowing with the time spent by the wireless communication, the rate information may be obtained and stored in the memory device. As an example, the processor may divide the service fee by the time spent to estimate the corresponding rate charged by the wireless network.

Figure 19:
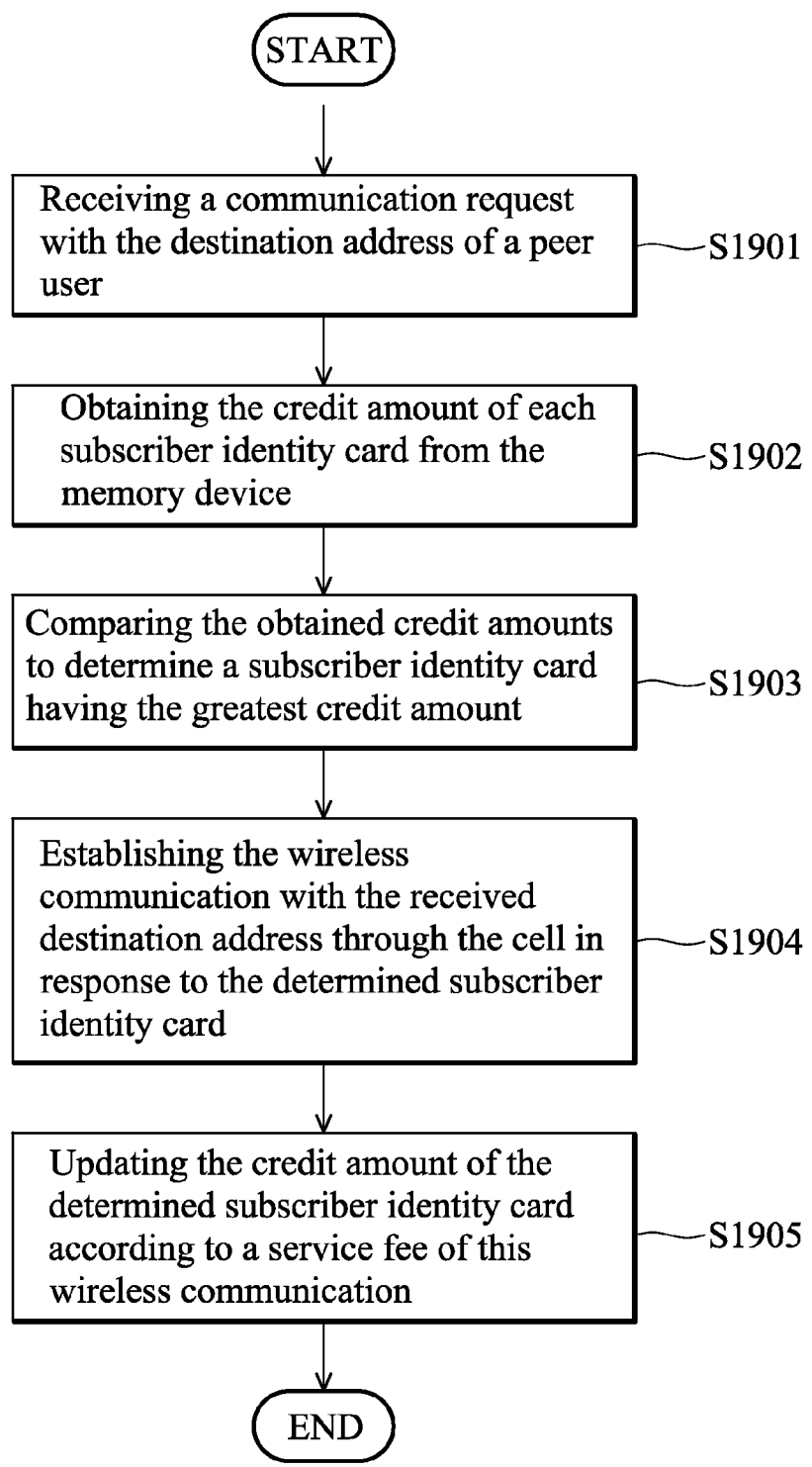
FIG. 19 shows a flow chart of a method for processing an apparatus originated communication request of a communication apparatus according to another embodiment of the invention.

FIG. 19 shows a flow chart of a method for processing an apparatus originated communication request of a communication apparatus, such as 100, 100A, 100B, or 100C previously described, according to an embodiment of the invention. According to an embodiment of the invention, the memory device, such as the 106, 106A, 106B or 106C, may store information indicating a credit amount for a deductible communication fee for each subscriber identity card, such as 101 and 102. As an example, the operator may define a certain amount of period charges (daily or monthly charges . . . etc.) for its services. When a user has paid for the previous charges, he is allowed to use the wireless communication services provided by the operator. Here, an operator may allow users to deduct a portion or the entire amount of the paid charges from the period ending charges for free. The deductible amount is also called the credit amount for deductible communication fee. According to the embodiment of the invention, the communication apparatus may store such information for users and when a next wireless communication is going to be established, the processor may select one subscriber identity card that has the greater credit amount, so that the user may receive the greatest available discount for period ending charges. As shown in FIG. 19, the flow chart begins when the processor, such as 105, 105A, 105B or 105C, receives the communication request with a destination address of a peer user (Step S1901). Next, the processor obtains the credit amount of each subscriber identity card from the memory device (Step S1902). Next, the processor compares the obtained credit amounts to determine which subscriber identity card has the greatest credit amount (Step S1903). Next, the processor establishes the wireless communication with the received destination address through the cell with the determined subscriber identity card, that is, the subscriber identity card with the greatest credit amount remaining (Step S1904). Finally, the processor updates the credit amount of the determined subscriber identity card according to a service fee of this wireless communication session (Step S1905). For example, the processor subtracts the service fee of this wireless communication session from the credit amount of the determined subscriber identity card.

According to an embodiment of the invention, the credit amounts of the subscriber identity cards may be input by the user via the MMI. The processor obtains that information from the MMI and stores it in the memory device. According to another embodiment of the invention, the processor may also obtain information regarding the credit amounts from the corresponding wireless network and store that information in the memory device. In addition, the service fee of this wireless communication session, as previously described, may be obtained according to a service fee message received from the corresponding wireless network after termination of this wireless communication session. According to still another embodiment of the invention, the processor may also estimate the service fee according to the time spent by the wireless communication and the rate recorded in the tariff table as previously described. As an example, the processor may multiply the time spent by the rate corresponding to the time of the established wireless communication session to obtain the estimated service fee, and update the credit amount of the determined subscriber identity card according to the estimated service fee. The method of obtaining the rates of each wireless network has already been mentioned above and is thus omitted here for brevity.

Figure 20:
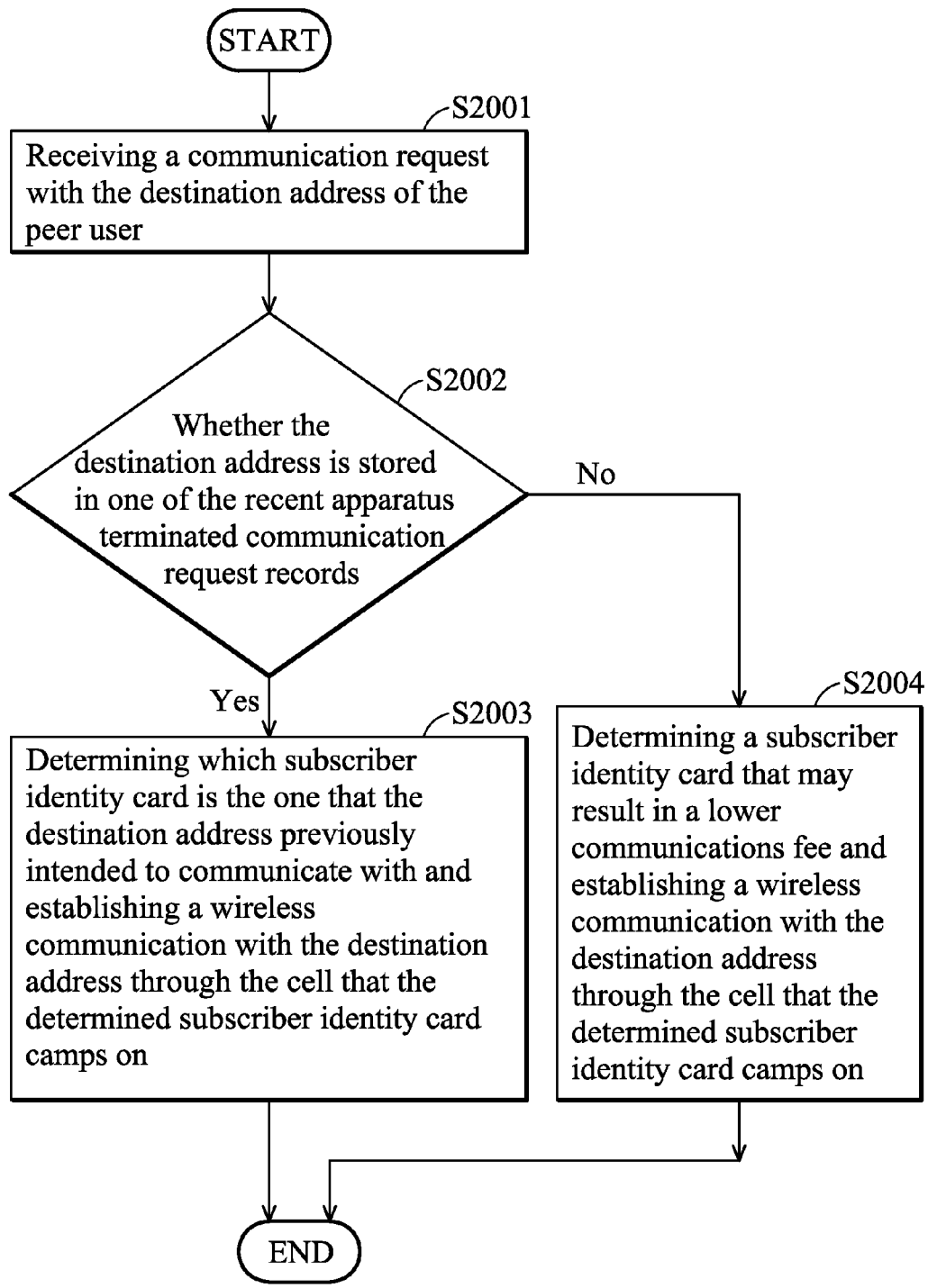
FIG. 20 shows a flow chart of a method for processing an apparatus originated communication request of a communication apparatus according to another embodiment of the invention.

FIG. 20 shows a flow chart of a method for processing an apparatus originated communication request of a communication apparatus, such as 100, 100A, 100B, or 100C previously described, according to another embodiment of the invention. According to an embodiment of the invention, the memory device, such as 106, 106A, 106B or 106C, may store a plurality of recent apparatus terminated communication request records for recording recently received apparatus terminated communication requests over a predetermined time period. For each apparatus terminated communication request, the record may comprise an origination address of a peer device, and information indicating either the subscriber identity card 101 or 102 as the one that the peer device was intending to communicate with. As shown in FIG. 20, the flow chart begins when the processor, such as 105, 105A, 105B or 105C, receives the communication request with a destination address of the peer user (Step S2001). Next, the processor determines whether the destination address is stored in one of the recent apparatus terminated communication request records (Step S2002). When the destination address is stored in one record, the processor determines which subscriber identity card was the one that the destination address previously intended to communicate with and establishes a wireless communication with the destination address through the cell that the determined subscriber identity card camps on (Step S2003).

Alternatively, when the destination address is not stored in any one of the records, the processor further determines a subscriber identity card that may result in a lower communications fee and establishes a wireless communication with the destination address through the cell that the determined subscriber identity card camps on (Step S2004). According to an embodiment of the invention, the method to determine whether a subscriber identity card that may result in a lower communications fee corresponds to the discount period for the wireless networks and choose the relevant subscriber identity card to camp on a wireless network that is currently providing the greatest discount, is as previously described above. According to another embodiment of the invention, the method to determine whether a subscriber identity card that may result in a lower communications fee corresponds to the rates currently being charged by each wireless network and choose the relevant one to camp on the lower rate wireless network, is as previously described above. According to yet another embodiment of the invention, the method to determine whether a subscriber identity card that may result in a lower communications fee corresponds to the credit amount for a deductible communications fee for each subscriber identity card and choose the subscriber identity card with the greatest remaining credit amount, is as previously described above. The previously mentioned embodiments have been described in detail above and are omitted here for brevity.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus having a first subscriber identity card camping on a first cell belonging to a first wireless network via a radio transceiver module, and a second subscriber identity card camping on a second cell belonging to a second wireless network via the same radio transceiver module as that in use for the first subscriber identity card or via a different radio transceiver module, the communication apparatus comprising:
    a memory device storing information indicating at least one discount period of the first wireless network and at least one discount period of the second wireless network; and
    a processor coupled to the first subscriber identity card, the second subscriber identity card and the memory device, receiving an apparatus originated communication request with a destination address, determining whether a current time falls within the discount period of the first wireless network or the discount period of the second wireless network, and establishing a wireless communication with a peer device of the received destination address through one of the first cell and the second cell in response to the fallen discount period.

2. The communication apparatus as claimed in claim 1, wherein the processor further obtains information regarding the discount period of the first wireless network and the discount period of the second wireless network via a man-machine interface (MMI), and stores the information in the memory device.

3. The communication apparatus as claimed in claim 1, further comprising a real time clock maintaining the current time, and wherein the processor obtains the current time by checking the real time clock.

4. The communication apparatus as claimed in claim 1, wherein the memory device further stores a tariff table of the first wireless network and a tariff table of the second wireless network, and wherein the tariff table comprises information regarding rates charged by the corresponding wireless network at different time periods.

5. The communication apparatus as claimed in claim 4, wherein the processor further compares the rates of the first wireless network and the second wireless network at the current time to obtain a lower rate wireless network when the current time falls in both the discount periods of the first wireless network and the second wireless network or when the current time does not fall in the discount period of the first wireless network and does not fall in the discount period of the second wireless network, and establishes the wireless communication with the peer device through one of the first cell and the second cell in response to the obtained lower rate wireless network.

6. The communication apparatus as claimed in claim 4, wherein the processor further obtains information regarding the rates of first wireless network and/or the rates of the second wireless network via a man-machine interface (MMI), and stores the information in the memory device.

7. The communication apparatus as claimed in claim 4, wherein the processor further obtains information regarding the rates of first wireless network and/or the rates of the second wireless network according to at least one Advice of Charge (AoC) message received from the first wireless network and/or the second wireless network, and stores the information in the memory device.

8. The communication apparatus as claimed in claim 4, wherein the processor further receives at least one service fee message from the first wireless network and/or the second wireless network for indicating a total service fee for at least one wireless communication session after termination of the wireless communication session, obtains a time spent by the wireless communication session, obtains information regarding the rates of first wireless network and/or the rates of the second wireless network according to the total service fee and the corresponding time spent, and stores the information in the memory device.

9. The communication apparatus as claimed in claim 1, wherein at least one of the first subscriber identity card and the second subscriber identity card is the subscriber identity module (SIM) card corresponding to the global system for mobile communications (GSM), the universal subscriber identity module (USIM) card corresponding to the universal mobile telecommunications system (UMTS) or time division-synchronous code division multiple access (TD-SCDMA) network, or the removable user identity module (RUIM) card or the CDMA subscriber identity module (CSIM) card corresponding to the code division multiple access (CDMA) 2000 communication system.

10. A communication apparatus having a first subscriber identity card camping on a first cell belonging to a first wireless network via a radio transceiver module, and a second subscriber identity card camping on a second cell belonging to a second wireless network via the same radio transceiver module as that in use for the first subscriber identity card or via a different radio transceiver module, the communication apparatus comprising:
    a memory device storing information indicating a credit amount for a deductible communication fee of the first subscriber identity card and a credit amount for a deductible communication fee of the second subscriber identity card; and
    a processor coupled to the first subscriber identity card, the second subscriber identity card and the memory device, receiving an apparatus originated communication request with a destination address, comparing the credit amount of the first subscriber identity card and the credit amount of the second subscriber identity card to determine one subscriber identity card with a greater credit amount, and establishing a wireless communication with a peer device of the received destination address through one of the first cell and the second cell in response to the determined subscriber identity card.

11. The communication apparatus as claimed in claim 10, wherein the processor further obtains information regarding the credit amount of the first subscriber identity card and/or the credit amount of the second subscriber identity card via a man-machine interface (MMI), and stores the information in the memory device.

12. The communication apparatus as claimed in claim 10, wherein the processor further obtains information regarding the credit amount of the first subscriber identity card and/or the credit amount of the second subscriber identity card from the corresponding first wireless network and/or the corresponding second wireless network, and stores the information in the memory device.

13. The communication apparatus as claimed in claim 10, wherein the processor further updates the credit amount of the determined subscriber identity card according to a total service fee of a wireless communication session.

14. The communication apparatus as claimed in claim 13, wherein the service fee of the wireless communication session is obtained according to a service fee message received from the corresponding wireless network establishing the wireless communication after termination of the wireless communication.

15. The communication apparatus as claimed in claim 13, wherein the memory device further stores a tariff table of the first wireless network for the first subscriber identity card and a tariff table of the second wireless network for the second subscriber identity card, each tariff table comprises information regarding rates charged by the corresponding wireless network at different time periods, wherein the service fee of the wireless communication session is estimated according to the corresponding tariff table for the determined subscriber identity card.

16. The communication apparatus as claimed in claim 13, wherein the processor further receives an Advice of Charge (AoC) message from the corresponding wireless network that is going to establish the wireless communication for indicating a rate to be charged, and estimates the service fee of the wireless communication session according to the rate.

17. A communication apparatus having a first subscriber identity card camping on a first cell belonging to a first wireless network via a radio transceiver module, and a second subscriber identity card camping on a second cell belonging to a second wireless network via the same radio transceiver module as that in use for the first subscriber identity card or via a different radio transceiver module, the communication apparatus comprising:

a memory device storing a plurality of recent apparatus terminated communication request records for recording recently received apparatus terminated communication requests over a predetermined period, wherein each record comprises an origination address of a peer device and information indicating either the first subscriber identity card or the second subscriber identity card that the peer device intended to communicate with for each apparatus terminated communication request; and a processor coupled to the first subscriber identity card, the second subscriber identity card and the memory device, receiving an apparatus originated communication request with a destination address, determining whether the destination address is stored in one of the recent apparatus terminated communication request records, and when the destination address is stored in one of the recent apparatus terminated communication request records, determining one of the first subscriber identity card and the second subscriber identity card, with which the destination address previously intended to communicate, and establishing a wireless communication with the destination address through one of the first cell and the second cell in response to the determined subscriber identity card.

18. The communication apparatus as claimed in claim 17, wherein the memory device further stores information indicating at least one discount period of the first wireless network and at least one discount period of the second wireless network, and when the destination address is not stored in any one of the recent apparatus terminated communication request records, the processor further determines whether a current time falls within the discount period of the first wireless network or the discount period of the second wireless network, and establishes the wireless communication through one of the first cell or the second cell in response to the fallen discount period.

19. The communication apparatus as claimed in claim 18, wherein the memory device further stores a tariff table of the first wireless network and a tariff table of the second wireless network, each tariff table comprises information regarding rates charged by the corresponding wireless network at different time periods, and wherein the processor further compares the rates of the first wireless network and the second wireless network at the current time to obtain a lower rate wireless network when the current time falls in both the discount periods of the first wireless network and the second wireless network or when the current time does not fall in the discount period of the first wireless network and does not fall in the discount period of the second wireless network, and establishes the wireless communication through one of the first cell or the second cell in response to the obtained lower rate wireless network.

20. The communication apparatus as claimed in claim 17, wherein the memory device further stores information indicating a credit amount for a deductible communication fee of the first subscriber identity card and a credit amount for a deductible communication fee of the second subscriber identity card, and when the destination address is not stored in any one of the recent apparatus terminated communication request records, the processor further compares the credit amount of the first subscriber identity card and the credit amount of the second subscriber identity card to determine one subscriber identity card with the greatest credit amount, and establishes the wireless communication through one of the first cell and the second cell in response to the determined subscriber identity card.

21. The communication apparatus as claimed in claim 20, wherein the processor further updates the credit amount of the determined subscriber identity card according to a total service fee of a wireless communication session.

22. A method for handling mobile originated call, executed by a processor, comprising:

providing information indicating at least one discount period of a first wireless network and at least one discount period of a second wireless network;

receiving an apparatus originated communication request with a destination address;

determining whether a current time falls within the discount period of the first wireless network or the discount period of the second wireless network; and establishing a wireless communication with a peer device of the received destination address through one of a first subscriber identity card associated with the first wireless network and a second subscriber identity card associated with the second wireless network in response to the fallen discount period.

23. The method as claimed in claim 22 further comprising obtaining the current time by checking a real time clock.

24. The method as claimed in claim 22 further comprising:
providing information regarding rates charged by the first wireless network and the second wireless network at different time periods;
comparing the rates of the first wireless network and the second wireless network at the current time to obtain a lower rate wireless network when the current time falls in both the discount periods of the first wireless network and the second wireless network or when the current time does not fall in the discount period of the first wireless network and does not fall in the discount period of the second wireless network; and
establishing the wireless communication with the peer device through one of the first subscriber identity card and the second subscriber identity card in response to the obtained lower rate wireless network.

25. The method as claimed in claim 22 further comprising:
receiving at least one service fee message from the first wireless network and/or the second wireless network for indicating a total service fee for at least one wireless communication session after termination of the wireless communication session;
obtaining a time spent by the wireless communication session;
obtaining information regarding the rates of first wireless network and/or the rates of the second wireless network according to the total service fee and the corresponding time spent; and
storing the information in a memory device.

26. The method as claimed in claim 24 further comprising:
receiving at least one service fee message from the first wireless network and/or the second wireless network for indicating a total service fee for at least one wireless communication session after termination of the wireless communication session;
obtaining a time spent by the wireless communication session;
obtaining information regarding the rates of first wireless network and/or the rates of the second wireless network according to the total service fee and the corresponding time spent; and
storing the information in a memory device.

27. A method for handling mobile originated call, executed by a processor, comprising:
providing information indicating a credit amount for a deductible communication fee of a first subscriber identity card and a credit amount for a deductible communication fee of a second subscriber identity card;
receiving an apparatus originated communication request with a destination address;
comparing the credit amount of the first subscriber identity card and the credit amount of the second subscriber identity card to determine one subscriber identity card with a greater credit amount; and
establishing a wireless communication with a peer device of the received destination address through the determined subscriber identity card.

28. The method as claimed in claim 27 further comprising updating the credit amount of the determined subscriber identity card according to a total service fee of a wireless communication session after termination of the wireless communication.

29. A method for handling mobile originated call, executed by a processor, comprising:
providing a plurality of recent apparatus terminated communication request records for recording recently received apparatus terminated communication requests over a predetermined period, wherein each record comprises an origination address of a peer device and information indicating either a first subscriber identity card or a second subscriber identity card that the peer device intended to communicate with for each apparatus terminated communication request;
receiving an apparatus originated communication request with a destination address;
determining whether the destination address is stored in one of the recent apparatus terminated communication request records; and
when the destination address is stored in one of the recent apparatus terminated communication request records, determining one of the first subscriber identity card and the second subscriber identity card, with which the destination address previously intended to communicate; and
establishing a wireless communication with the destination address via the determined subscriber identity card.

* * * * *